United States Patent
Zhang et al.

(10) Patent No.: US 9,821,724 B2
(45) Date of Patent: Nov. 21, 2017

(54) MOUNTING APPARATUS FOR PORTABLE ELECTRONIC DEVICE

(71) Applicant: Ping Zhang, Wexford, PA (US)

(72) Inventors: Ping Zhang, Wexford, PA (US); Changwen Lan, Dongguan (CN)

(73) Assignee: Ping Zhang, Radfordwoods, PA (US)

( * ) Notice: Subject to any disclaimer, the term of this patent is extended or adjusted under 35 U.S.C. 154(b) by 0 days.

(21) Appl. No.: 15/161,630

(22) Filed: May 23, 2016

(65) Prior Publication Data

US 2016/0318455 A1    Nov. 3, 2016

Related U.S. Application Data

(63) Continuation-in-part of application No. 14/618,133, filed on Feb. 10, 2015, now Pat. No. 9,573,531.

(51) Int. Cl.
| | |
|---|---|
| *B60R 11/02* | (2006.01) |
| *H04M 1/04* | (2006.01) |
| *F16M 11/04* | (2006.01) |
| *F16M 11/14* | (2006.01) |
| *F16M 11/20* | (2006.01) |

(Continued)

(52) U.S. Cl.
CPC .......... *B60R 11/02* (2013.01); *F16B 47/006* (2013.01); *F16M 11/041* (2013.01); *F16M 11/105* (2013.01); *F16M 11/14* (2013.01); *F16M 11/16* (2013.01); *F16M 11/2007* (2013.01); *F16M 11/2021* (2013.01); *F16M 13/022* (2013.01); *H04M 1/04* (2013.01); *B60R 2011/0005* (2013.01); *B60R 2011/007* (2013.01); *B60R 2011/0008* (2013.01); *B60R 2011/0071* (2013.01); *B60R 2011/0089* (2013.01);

(Continued)

(58) Field of Classification Search
CPC ............ B60R 11/02; B60R 2011/0005; B60R 2011/0008; B60R 2011/007; B60R 2011/0071; B60R 2011/0089; F16B 47/006; F16B 2001/0035; F16M 11/041; F16M 11/105; F16M 11/14; F16M 11/16; F16M 11/2007; F16M 11/2021; F16M 13/022; F16M 2200/021; H04M 1/04
USPC .......................................... 224/483
See application file for complete search history.

(56) References Cited

U.S. PATENT DOCUMENTS

D690,707 S  * 10/2013  Minn .......................... D14/447
8,857,687 B1 * 10/2014  An ........................... B60R 11/02
                                                           224/282

(Continued)

*Primary Examiner* — Peter Helvey
(74) *Attorney, Agent, or Firm* — Na Xu; IPro, PLLC

(57) ABSTRACT

Described herein is a mounting apparatus, comprising a magnetic component, and a mount; wherein the magnetic component comprises one or more permanent magnet; wherein the mounting apparatus is configured to attach to a surface through a magnetic interaction between the magnetic component and a material that is ferromagnetic or ferromagnetic in the surface; wherein the mount comprises a plurality of clips which are configured to be mounted on an air vent in a vehicle. The mounting apparatus provides mounting of any appropriately sized electronic device in a vehicle, to allow convenient viewing and access to the device. The presently disclosed mounting apparatus also realizes a continuous rotation and continuous movement of the portable electronic device while it is held by the mounting apparatus, therefore facilitating user control of the device.

18 Claims, 29 Drawing Sheets

US 9,821,724 B2

Page 2

(51) Int. Cl.
  *F16M 13/02* (2006.01)
  *F16B 47/00* (2006.01)
  *F16M 11/10* (2006.01)
  *F16M 11/16* (2006.01)
  *B60R 11/00* (2006.01)
  *F16B 1/00* (2006.01)

(52) U.S. Cl.
  CPC ............. *F16B 2001/0035* (2013.01); *F16M 2200/021* (2013.01)

(56) References Cited

U.S. PATENT DOCUMENTS

| | | | |
|---|---|---|---|
| 9,080,714 B2* | 7/2015 | Minn | B60R 11/0241 |
| 9,586,530 B2* | 3/2017 | Kim | F16M 11/08 |
| 2010/0019059 A1* | 1/2010 | Bulsink | A61L 9/127 |
| | | | 239/55 |
| 2014/0138419 A1* | 5/2014 | Minn | B60R 11/0241 |
| | | | 224/567 |
| 2015/0072555 A1* | 3/2015 | Riddiford | F16M 11/041 |
| | | | 439/575 |

\* cited by examiner

MOUNTING APPARATUS FOR PORTABLE ELECTRONIC DEVICE

FIELD OF INVENTION

The present disclosure relates to a mounting apparatus, in particular to a mounting apparatus with magnetic components for securing and displaying portable electronic devices.

BACKGROUND

Portable electronic devices (PEDs) include, but are not limited to, any kind of electronic devices that may be carried with a user, such as tablets, laptops, MP3 players, cell phones, iPods, iPhones, iPads, e-readers, satellite radios, PDAs, GPSs or other digital devices. Given the rapid advance of technology in personal media and internet, a user may prefer to use various types of portable electronic devices at any time and at many places, therefore necessitating use of a mounting apparatus for mounting the PEDs.

The disclosure describes herein a mounting apparatus for the mounting any appropriately sized electronic device in a vehicle, at home, in an office, and at other private or public places. The presently disclosed mounting apparatus ensures the securing and displaying of a portable electronic device to allow convenient viewing and access to the device. The presently disclosed mounting apparatus also realizes a continuous rotation and continuous movement of the portable electronic device while it is attached to the mounting apparatus, therefore facilitating convenient and easy adjustment of the view of the user.

SUMMARY OF INVENTION

Described herein is a mounting apparatus, comprising a receiving component, and an attachment component; the receiving component comprises a first magnetic component; the attachment component comprises a second magnetic component; the receiving component comprises a first arm, and a second arm; the receiving component is configured to hold a portable electronic device by the first arm and the second arm; the first magnetic component and the second magnetic component are configured to connect through a magnetic interaction; the first magnetic component is continuously rotatable and continuously movable relative to the second magnetic component while the first magnetic component and the second magnetic component are connected; the receiving component comprises a first contact surface; and the attachment component comprises a second contact surface.

According to an embodiment of the mounting apparatus, the first magnetic component comprises one or more pieces that are ferromagnetic or ferrimagnetic; and the second magnetic component comprises one or more permanent magnets.

According to an embodiment of the mounting apparatus, the first magnetic component comprises one or more permanent magnets; and the second magnetic component comprises one or more pieces that are ferromagnetic or ferrimagnetic.

According to an embodiment of the mounting apparatus, the first magnetic component comprises one or more permanent magnets; and the second magnetic component comprises one or more permanent magnets.

According to an embodiment of the mounting apparatus, the second magnetic component further comprises a second piece that is ferromagnetic or ferrimagnetic; and the second magnetic component is sandwiched between the second piece and the second contact surface.

According to an embodiment of the mounting apparatus, the first magnetic component and the second magnetic component are configured to connect while the first magnetic component and the second magnetic component are either partially or fully aligned.

According to an embodiment of the mounting apparatus, the first magnetic component or the second magnetic component comprises an annular or circular plate.

According to an embodiment of the mounting apparatus, the first arm and the second arm of the receiving component are movable relative to each other.

According to an embodiment of the mounting apparatus, the first arm comprises a first arm piece, and a first member with a sliding slot; the second arm comprises a second arm piece and a sliding member; the sliding member of the second arm is configured to slide in the sliding slot of the first arm.

According to an embodiment of the mounting apparatus, the first arm piece or the second arm piece comprises a cushion.

According to an embodiment of the mounting apparatus, adjustment of relative distance between the first arm and the second arm is continuous.

According to an embodiment of the mounting apparatus, the receiving component further comprises a spring configured to urge the first arm piece and the second arm piece toward each other.

According to an embodiment of the mounting apparatus, the attachment component comprises a base, and a mounting member; the base is configured to removably attach to a surface; and the mounting member is configured to support a connection to the second magnetic component.

According to an embodiment of the mounting apparatus, the mounting member of the attachment component comprises an angle-adjusting knob configured to allow 360 degree rotation of the second magnetic component.

According to an embodiment of the mounting apparatus, the mounting member of the attachment component further comprises a mount-adjusting knob configured to allow folding or unfolding of the mounting member.

According to an embodiment of the mounting apparatus, the base comprises suction cup; the mounting member of the attachment component further comprises a suction cup lever configured to lock and unlock attachment of the suction cup of the base to a surface; and the suction cup is configured to be engaged in airtight suction to the surface by forming substantial contact to the surface.

According to an embodiment of the mounting apparatus, the first contact surface and the second contact surface are of a pair with a concave surface and convex surface that have matching contours.

According to an embodiment of the mounting apparatus, the attachment component further comprises a mount that is configured to be mounted on an air vent in a vehicle.

According to an embodiment of the mounting apparatus, the attachment component further comprises a mount that is configured to be mounted on a CD slot in a vehicle.

Further described herein is a mounting apparatus, comprising a receiving component; the receiving component comprises a first magnetic component; the first magnetic component comprises one or more permanent magnet; the receiving component is configured to attach to a surface through a magnetic interaction between the first magnetic component and a material that is ferromagnetic or ferromagnetic in the surface; and the receiving component comprises a first arm, and a second arm; wherein the receiving component is configured to hold a portable electronic device by the first arm and the second arm.

According to an embodiment of the mounting apparatus, the first arm and the second arm of the receiving component are movable relative to each other.

According to an embodiment of the mounting apparatus, adjustment of relative distance between the first arm and the second arm is continuous.

According to an embodiment of the mounting apparatus, the first arm comprises a first arm piece, and a first member with a sliding slot; the second arm comprises a second arm piece and a sliding member; and the sliding member of the second arm is configured to slide in the sliding slot of the first arm.

According to an embodiment of the mounting apparatus, the mounting apparatus further comprises a spring configured to urge the first arm piece and the second arm piece toward each other.

According to an embodiment of a mounting apparatus, the mounting apparatus comprises a magnetic component, and a mount; wherein the magnetic component comprises one or more permanent magnet; wherein the mounting apparatus is configured to attach to a surface through a magnetic interaction between the magnetic component and a material that is ferromagnetic or ferromagnetic in the surface; wherein the mount comprises a plurality of clips which are configured to be mounted on an air vent in a vehicle.

According to an embodiment of the mounting apparatus, the plurality of clips are arranged to be perpendicular to the magnetic component.

According to an embodiment of the mounting apparatus, the plurality of clips are configured to be rotatable relative to the magnetic component while the plurality of clips maintain perpendicular to the magnetic component.

According to an embodiment of the mounting apparatus the plurality of clips are configured to be rotatable relative to the magnetic component so that an angle between the plurality of clips and the magnetic component is adjustable.

According to an embodiment of the mounting apparatus, each of the plurality of clips has a first end close to the magnetic component and a second end further away from the magnetic component, and a cross sectional area of the second end is smaller than a cross sectional area of the first end.

According to an embodiment of the mounting apparatus, the plurality of clips are made of elastic material such that each second end of the plurality of clips are bendable relative to each other.

According to an embodiment of the mounting apparatus, the plurality of clips are four clips comprising a first pair of two clips and a second pair of two clips; wherein a first inner distance between the two clips in the first pair and a second inner distance between the two clips in the second pair are the same.

According to an embodiment of the mounting apparatus, a inter distance between the first pair and the second pair is greater than the first inner distance.

According to an embodiment of the mounting apparatus, the four clips are arranged to be spaced apart along a circle.

According to an embodiment of the mounting apparatus, each of the four clips has a first end close to the magnetic component and a second end further away from the magnetic component, and a cross sectional area of the second end is smaller than a cross sectional area of the first end.

According to an embodiment of the mounting apparatus, the cross section of each of the first end has a quadrant shape.

According to an embodiment of the mounting apparatus, the plurality of clips comprises a first part and a second part; wherein the first part comprises a top plate that joins four inner clips at four side of the top plate; wherein each inner clip extends from the top plate at an angle close to the top plate.

According to an embodiment of the mounting apparatus, the angle is in a range from 45 degree to 90 degree.

According to an embodiment of the mounting apparatus, the second part is configured to form a case for the first part and the second part comprises pockets, a recess, and contacting surfaces; wherein each pocket is configured to enclose an inner clip of the four inner clips, and the recess comprises a flat surface that is configured to form a support to the top plate in the first part and a vertical sidewall for enclosing the top plate; wherein the contacting surfaces at each center-facing exterior side of the pockets is configured to form contact with a mounting surface on a car vent.

According to an embodiment of the mounting apparatus, the mounting apparatus comprises a ball joint knob that comprises a stud and a socket; wherein the ball joint knob is configured for allowing free movement of the plurality of clips in two planes at the same time.

According to an embodiment of the mounting apparatus, the stud comprise a the ball part of stud that fits into the socket; wherein the socket is removably connected to a head of the mounting apparatus through a screwing thread; wherein an extension on the stud connects to the plurality of clips.

The presently disclosed mounting apparatus ensures the holding and securing of a portable electronic device on the mounting apparatus and attachment to a surface to allow convenient viewing and access to the device. The presently disclosed mounting apparatus also realizes a continuous rotation and continuous movement of the portable electronic device while it is held by the mounting apparatus, therefore facilitating user control of the device.

Other objects and advantages of the mounting apparatus will be apparent to those skilled in the art based on the following drawings and detailed description. It also is to be understood that both the foregoing general description and the following detailed description are exemplary and not restrictive of the scope of the embodiments.

BRIEF DESCRIPTION OF THE FIGURES

FIG. 1A is a left side view thereof; FIG. 1B is a right side view thereof; FIG. 1C is a front view thereof; FIG. 1D is a back view thereof; FIG. 1E is a top view thereof; FIG. 1F is a bottom view thereof, FIGS. 1G and 1H are a left side views thereof showing angle adjustments of attachment component and the receiving component achievable by a user.

FIG. 2A is a left side view thereof; FIG. 2B is a right side view thereof; FIG. 2C is a front view thereof; FIG. 2D is a back view thereof; FIG. 2E is a top view thereof; and FIG. 2F is a bottom view thereof.

FIG. 3A is perspective view thereof; FIG. 3B shows the second arm of the receiving component being pulled away from the first arm; FIG. 3C is an explosion view thereof; and FIG. 3D is a bottom view thereof.

FIG. 5A is a bottom view of assembly of the first arm, springs and second arm; FIG. 5B is a bottom view of assembly of the first arm, springs and second arm with the second arm being pulled away from the first arm; FIG. 5C is a bottom view of only the second arm; FIG. 5D is a front view of only the second arm.

FIG. 6A is a front view thereof; and FIG. 6B is a back view thereof.

FIG. 7A is a front view thereof; and FIG. 7B is a back view thereof.

DETAILED DESCRIPTION

Figure 1A:
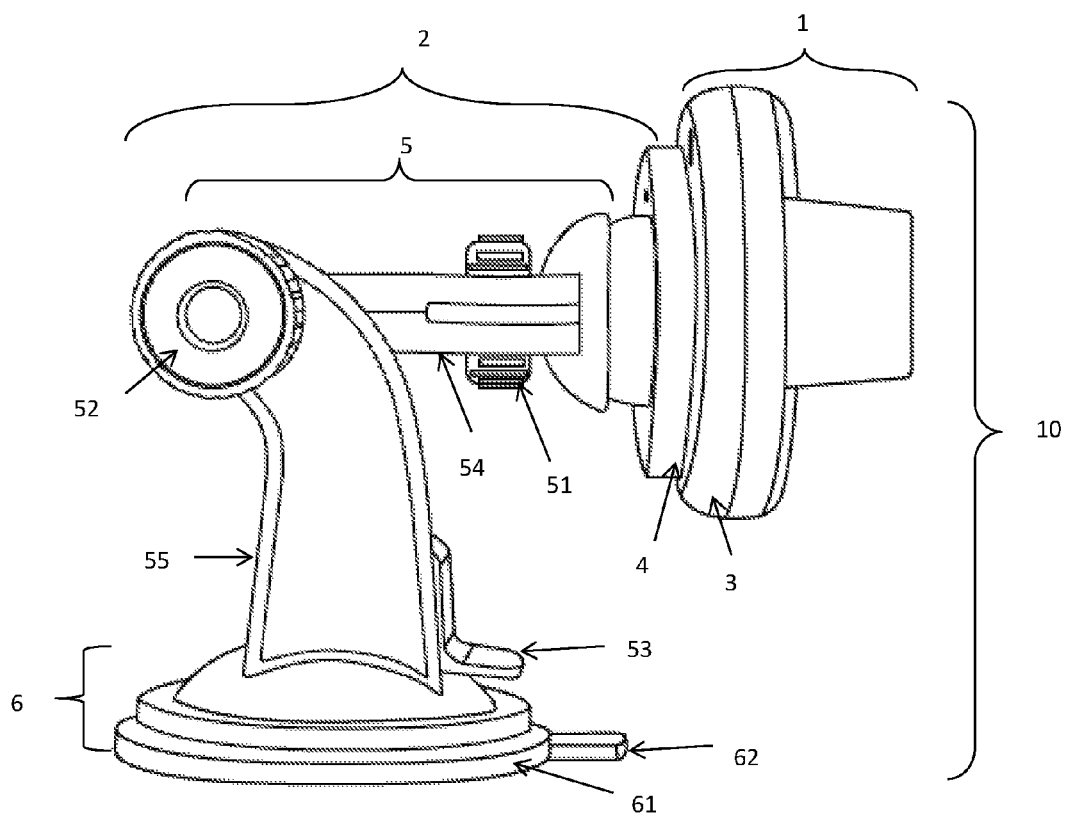
FIG. 1A-H is an illustration according to an embodiment of a mounting apparatus for a portable electronic device, showing the receiving component and the attachment component being connected to each other.
Figure 1B:
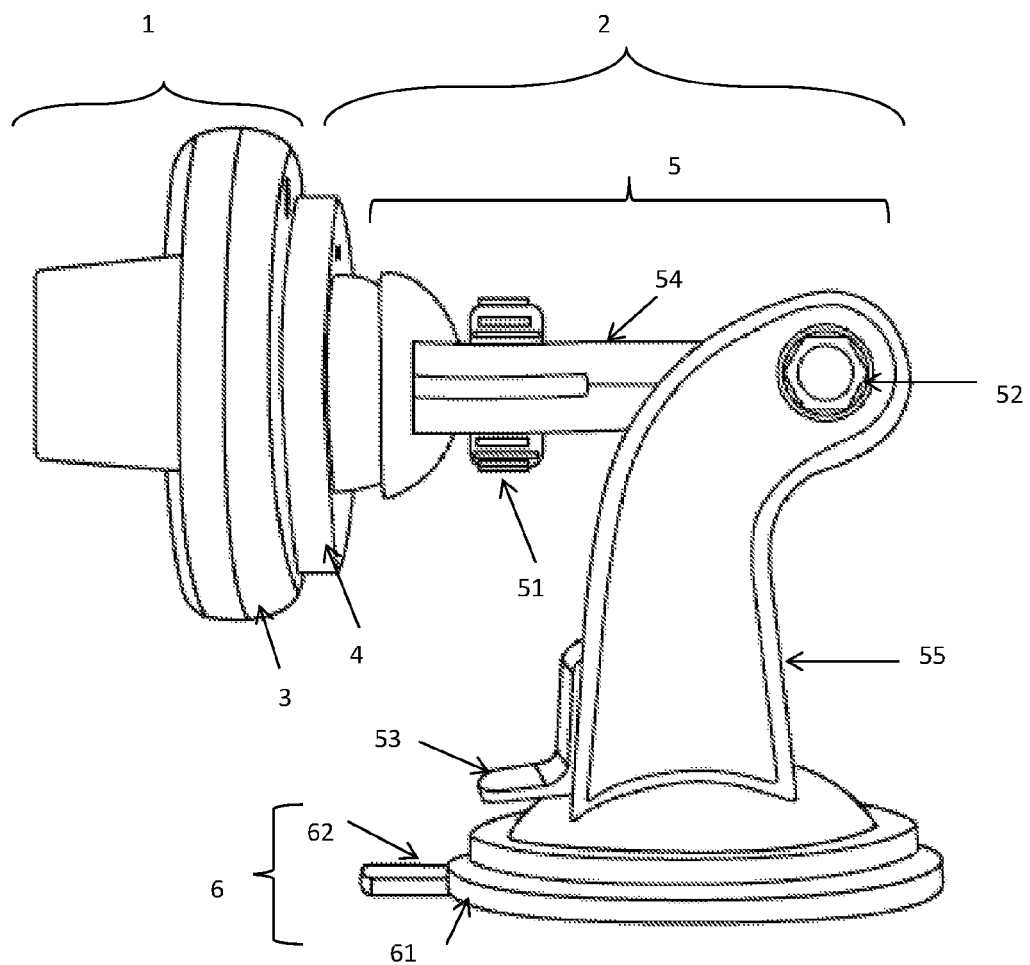
Figure 1C:
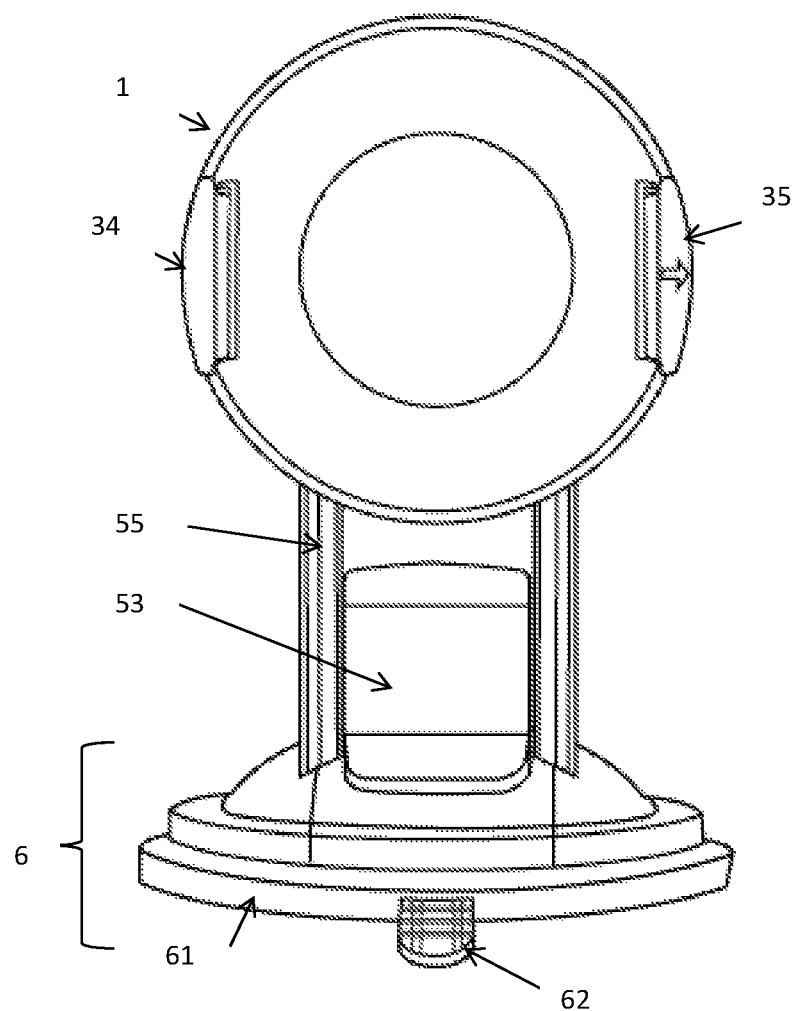
Figure 1D:
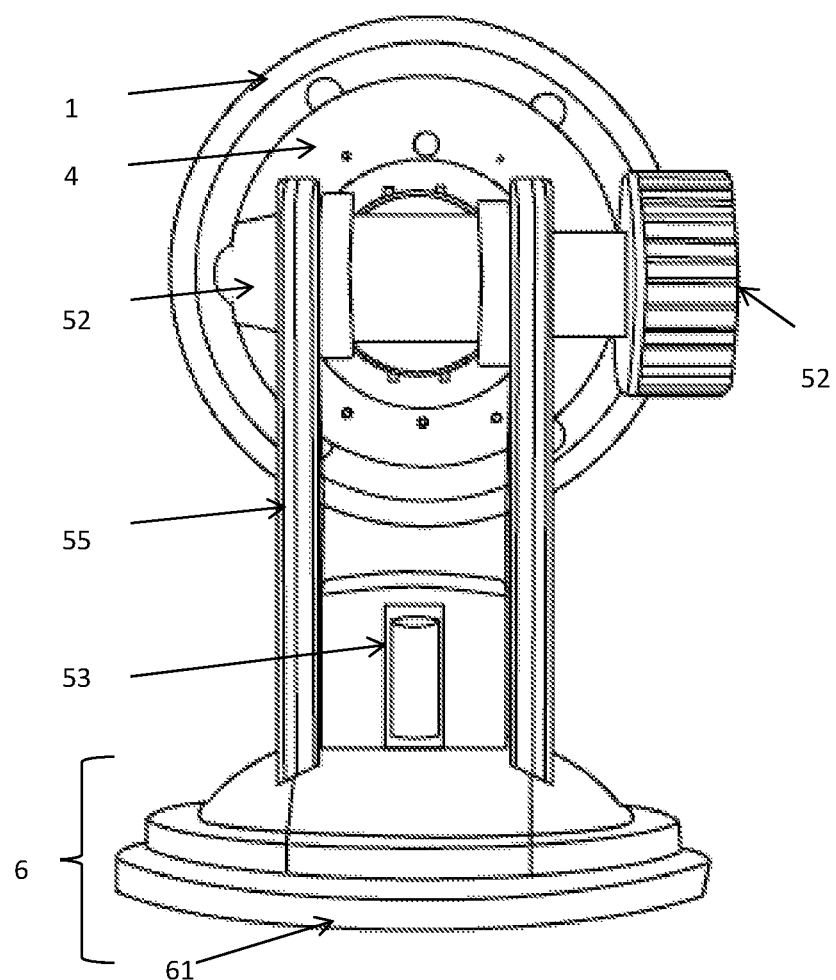
Figure 1E:
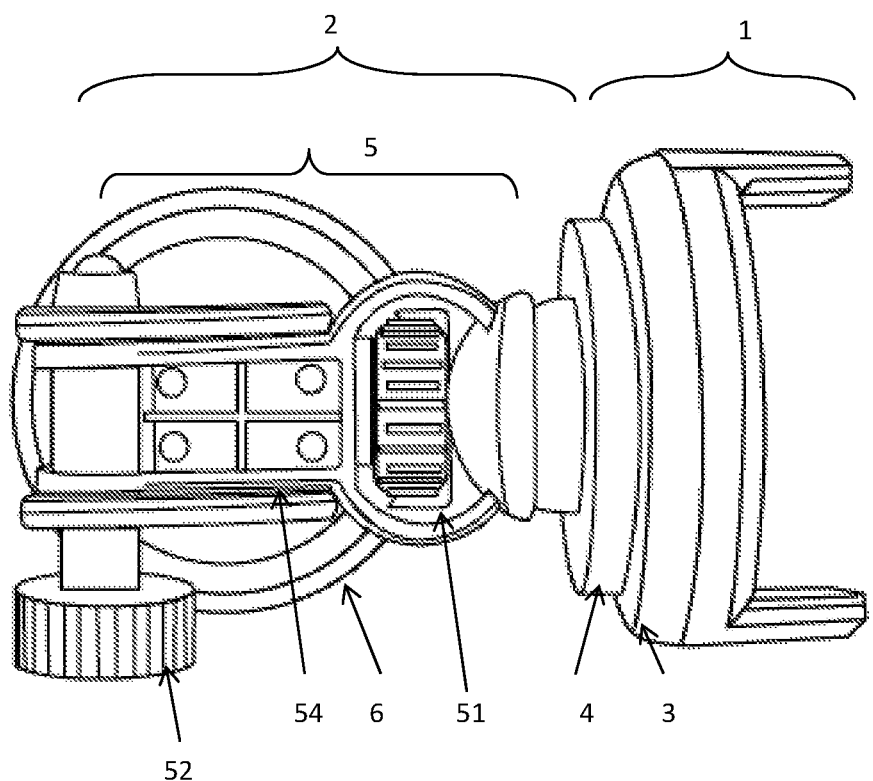
Figure 1F:
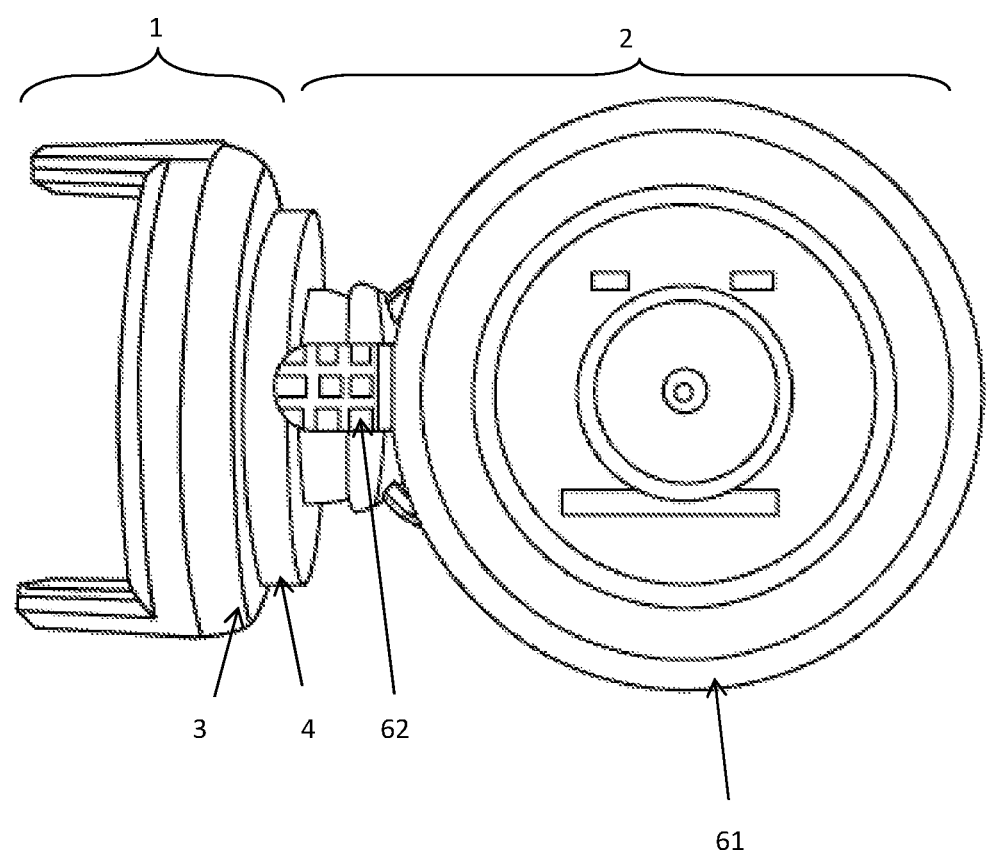
Figure 1G:
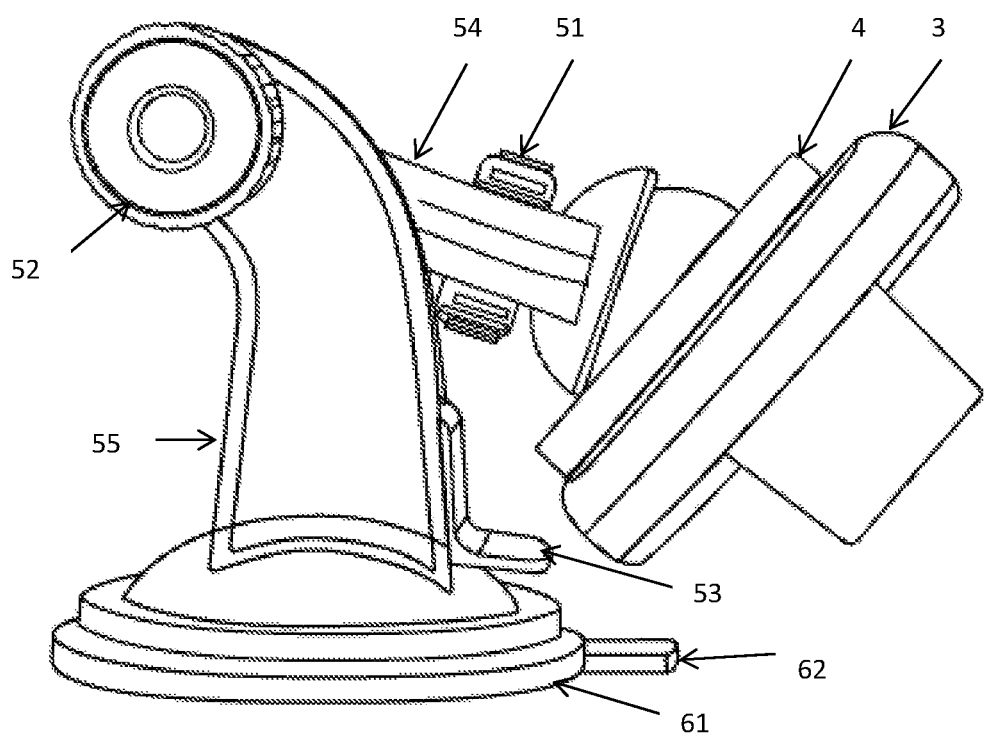
Figure 1H:
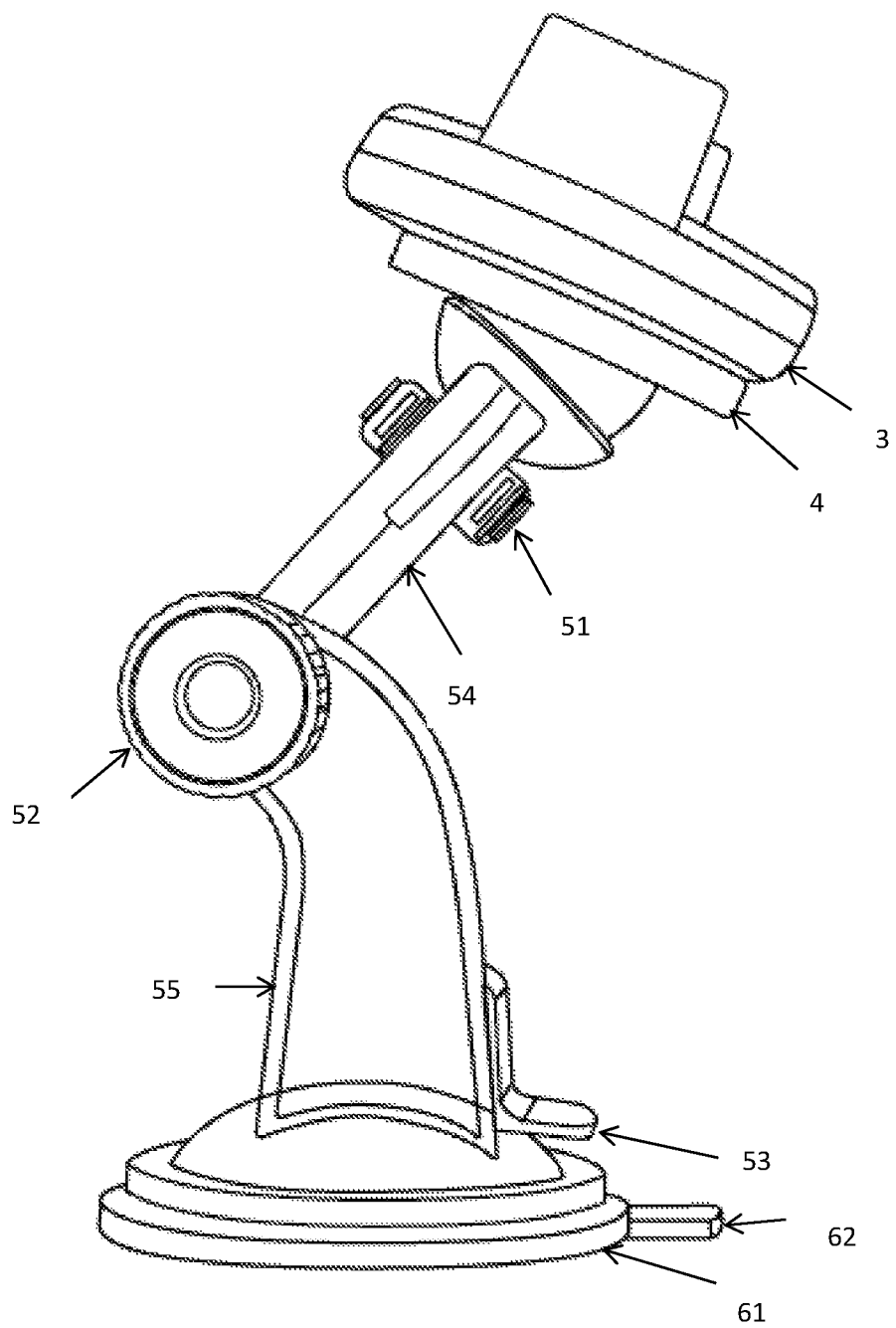
Figure 2A:
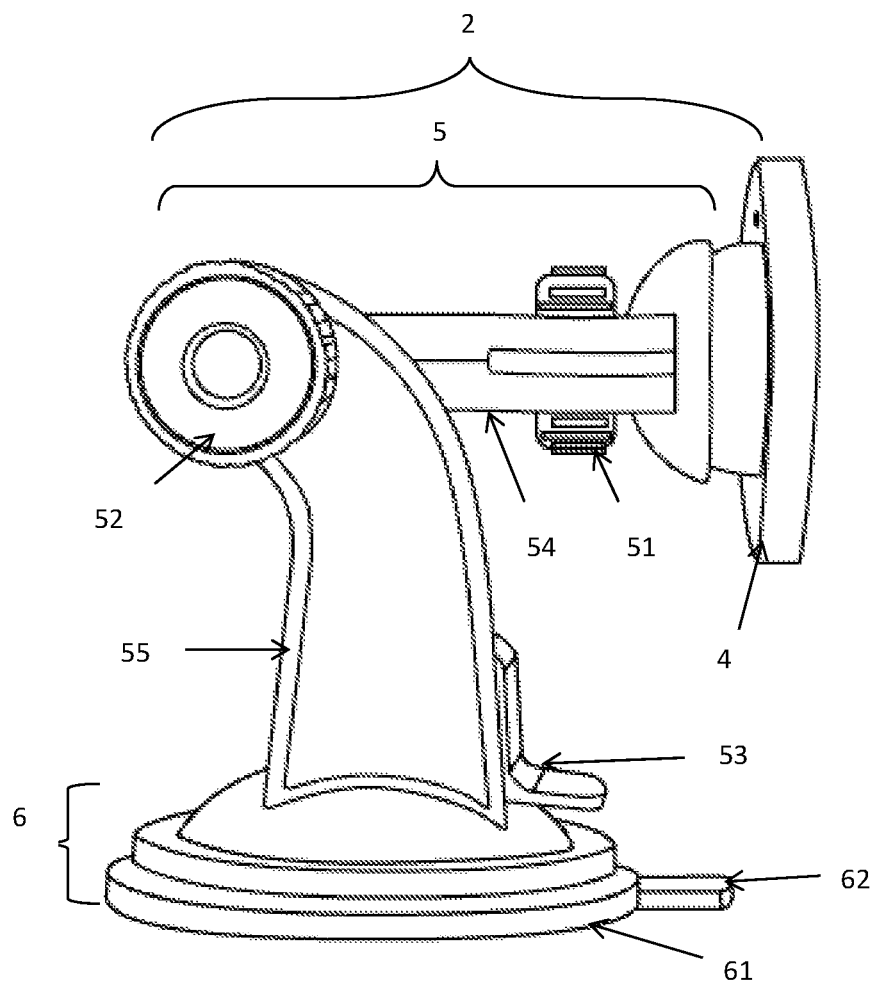
FIG. 2A-F is an illustration according to the embodiment of a mounting apparatus for a portable electronic device in FIG. 1, showing only the attachment component.
Figure 2B:
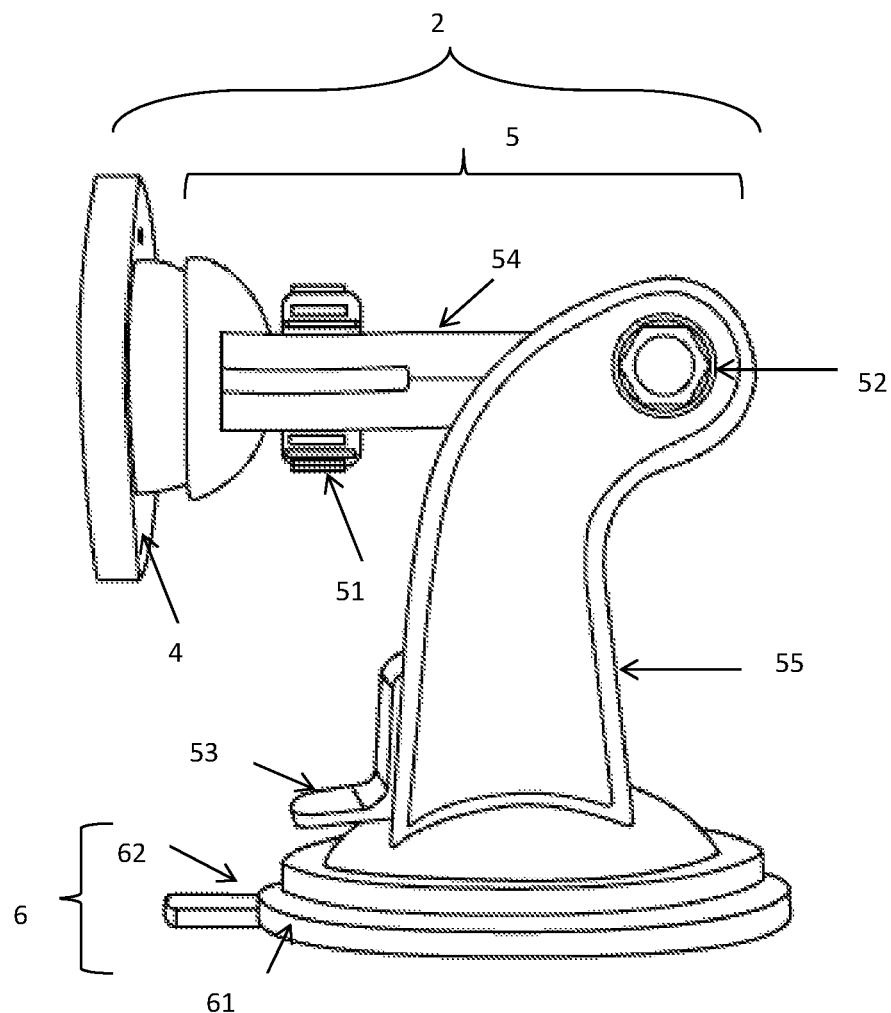
Figure 2C:
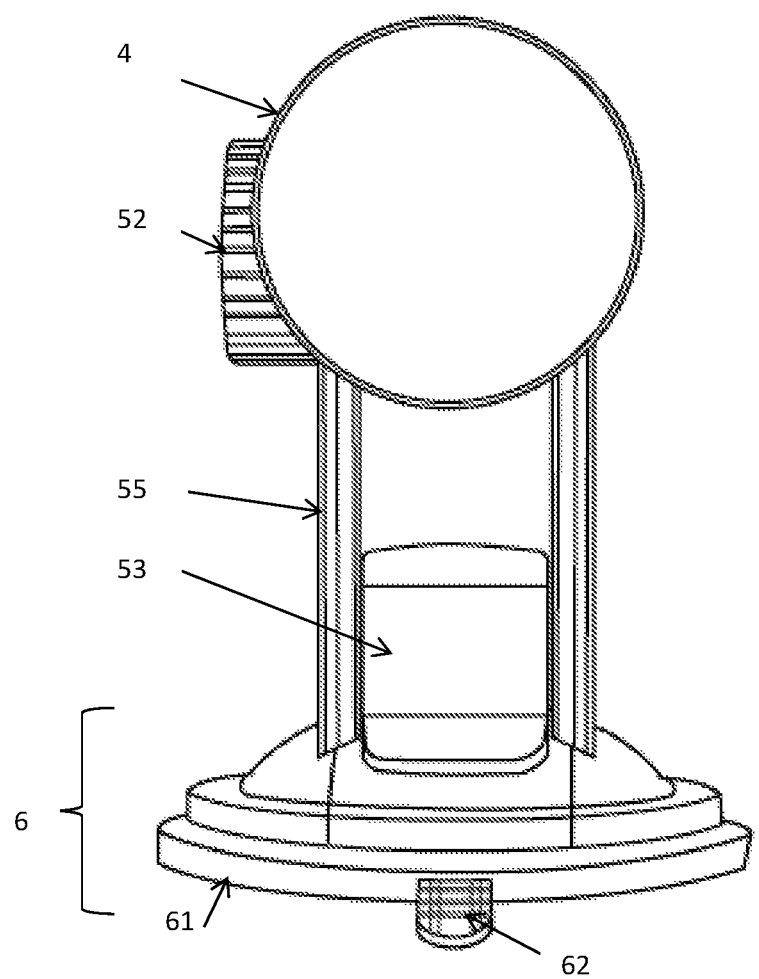
Figure 2D:
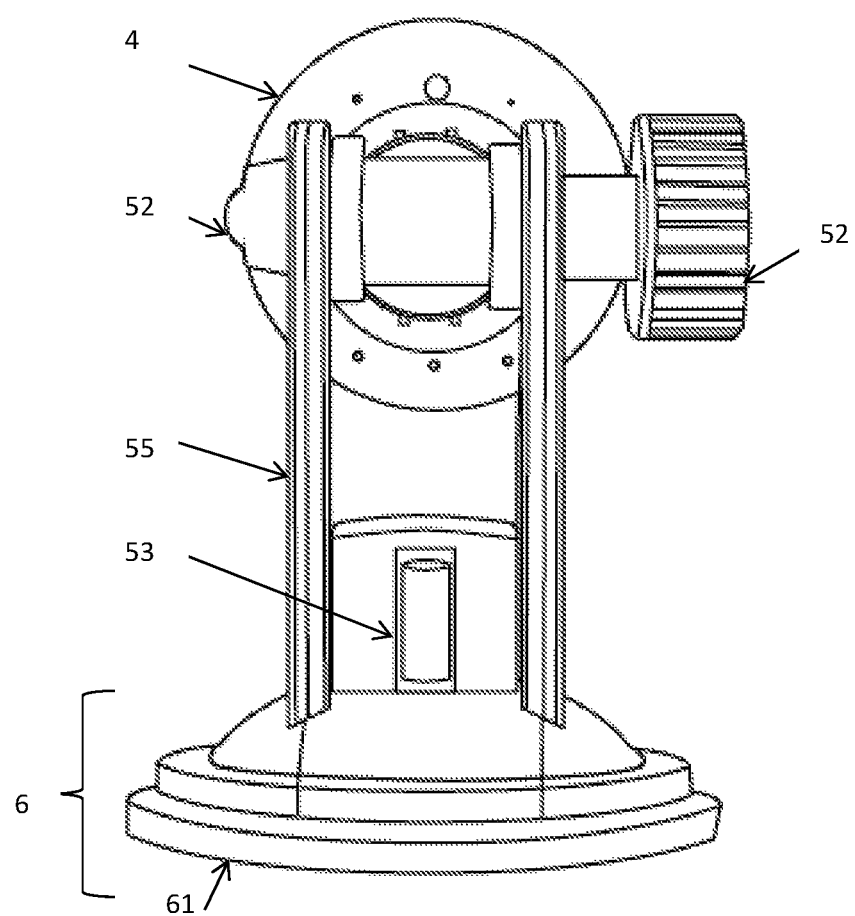
Figure 2E:
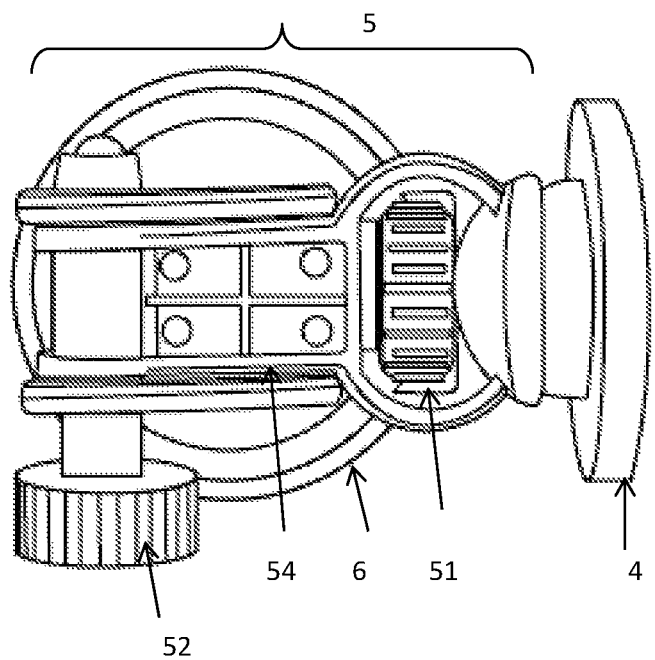
Figure 2F:
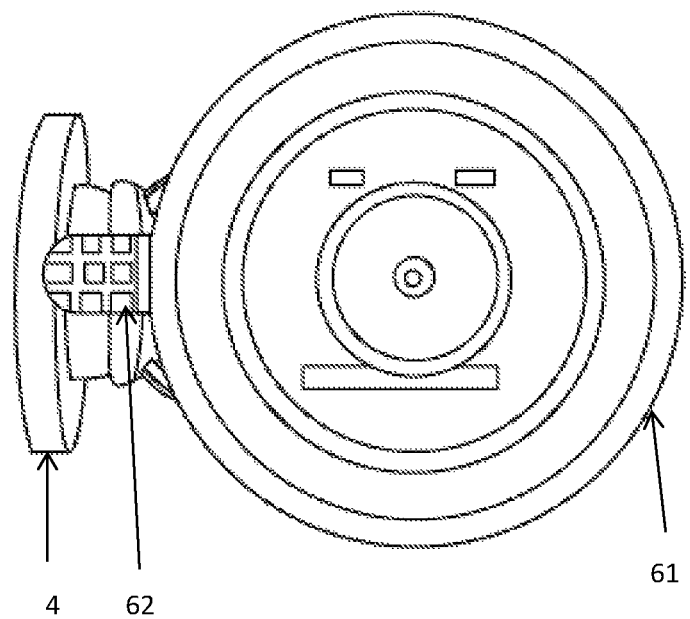

As shown in FIG. 1, according to one embodiment, a mounting apparatus 10 may comprise a receiving component 1, and an attachment component 2. The receiving component 1 comprises a first magnetic component 3. The attachment component 2 comprises a second magnetic component 4. The receiving component 1 comprises a first arm 34, and a second arm 35; the receiving component 1 is configured to hold a portable electronic device by the first arm 34 and the second arm 35.

The first arm 34 and the second arm 35 may be arranged symmetrically on the receiving component 1. Alternatively the first arm 34 and the second arm 35 may be arranged asymmetrically on the receiving component 1. The receiving component may also comprise more than two arms for securing a portable electronic device.

Furthermore, the first magnetic component 3 and the second magnetic component 4 are configured to connect through a magnetic interaction. As used herein, a magnetic interaction refers to a magnetic dipole-dipole interaction, also called dipolar coupling, which is direct interaction between two magnetic dipoles. Examples of magnetic interactions include, but are not limited to, interactions between a north pole of a magnet and a South pole of a magnet, between a permanent magnet and a material that is ferromagnetic or ferromagnetic.

During use, when the first magnetic component 3 is within a close distance of the second magnetic component 4, the first magnetic component 3 and the second magnetic component 4 are drawn toward each other due to magnetic interaction. Such magnetic interaction allows the first magnetic component 3 and the second magnetic component 4 to connect or attach stably, and to stay connected or attached; therefore the receiving component 1 may be connected to the attachment component 2 through the magnetic interaction and connection between the first magnetic component 3 and the second magnetic component 4. During use, a user may choose between two operation methods. In a first operation method, a user may attach or connect the receiving component 1 to the attachment component 2, and then may place a portable electronic device on the receiving component 1. In a second operation method, a user may place a portable electronic device in the receiving component 1 first, and then attach or connect the receiving component 1 with the portable electronic device to the attachment component 2.

Furthermore, the first magnetic component 3 is continuously rotatable and continuously movable relative to the second magnetic component 4 while the first magnetic component 3 and the second magnetic component 4 are connected. During use, a user may adjust his or her view of a portable electronic device held by the mounting apparatus, by either continuously rotating or continuously moving or sliding the portable electronic device relative to the attachment component 2, while the receiving component stays connected to the attachment component through magnetic interaction between the first magnetic component 3 and the second magnetic component 4. In addition, because the rotation or sliding movement does not interfere with the magnetic interaction when an appropriate force is applied, there is no need to either detach the portable electronic device from mounting apparatus, or to detach the receiving component 1 from the attachment component 2.

Furthermore, the receiving component 1 comprises a first contact surface 31; and the attachment component 2 comprises a second contact surface 41. Preferably, the first contact surface 31 and the second contact surface 41 contact each other while the first magnetic component 3 and the second magnetic component 4 are connected through magnetic interaction. In one example, the first contact surface 31 and the second contact surface 41 are substantially planar. In an alternative example, the first contact surface 31 and the second contact surface 41 are of a pair with matching surface contours, such as a pair with a concave surface and convex surface. In another alternative example, the first contact surface 31 and the second contact surface 41 do not have matching contours.

According to an embodiment, the first magnetic component 3 comprises one or more pieces 32 that comprise ferromagnetic or ferromagnetic material. The second magnetic component 4 may comprise one or more permanent magnets. As used herein, ferromagnetic or ferrimagnetic material include, but are not limited to Co, Fe, $Fe_2O_3$, FeO, $Fe_2O_3$, $NiOFe_2O_3$, $CuOFe_2O_3$, $MgOFe_2O_3$, MnBi, Ni, MnSb, $MnOFe_2O_3$, $Y_3Fe_5O_{12}$, $CrO_2$, MnAs, Gd, Dy, EuO. As used herein, a permanent magnet comprises a material that is magnetized and creates its own persistent magnetic field. The one or more pieces 32 may comprise any size, shape or number of pieces of ferromagnetic or ferromagnetic materials.

Figure 3A:
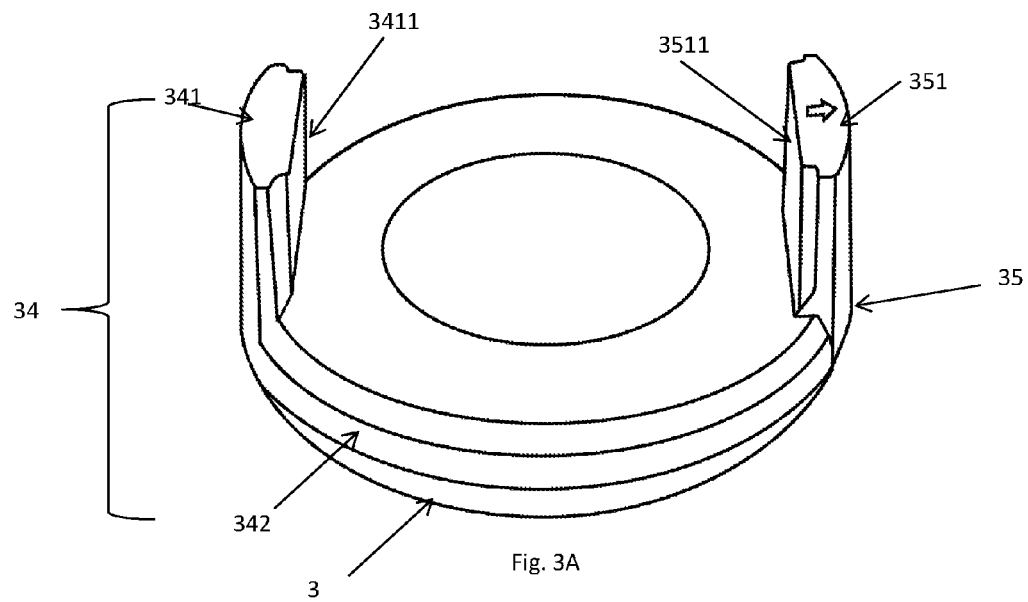
FIG. 3A-D is an illustration according to an embodiment of a mounting apparatus for a portable electronic device in FIG. 1, showing only the receiving component.
Figure 3B:
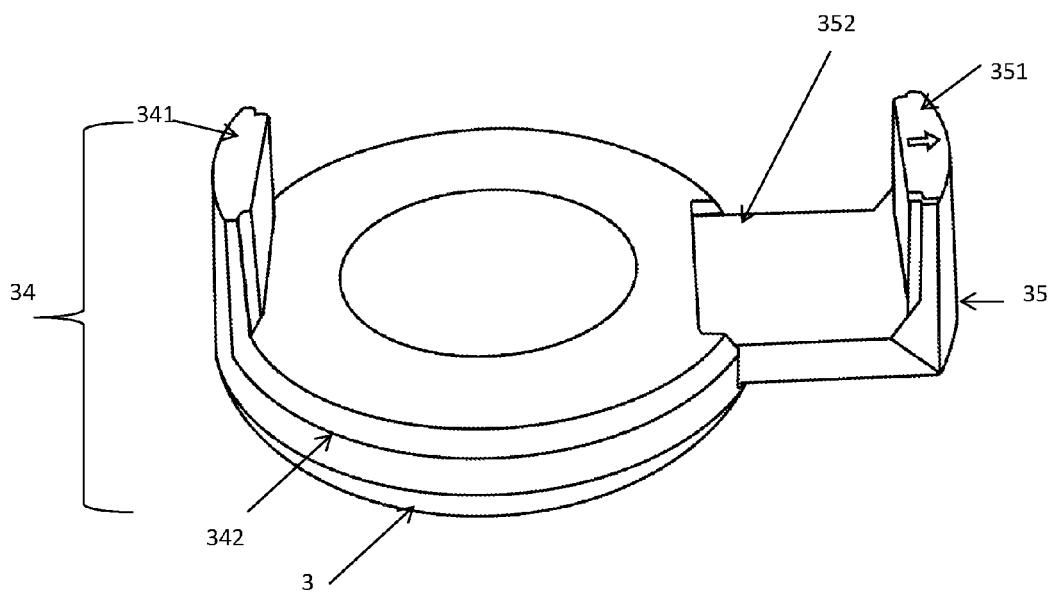
Figure 3C:
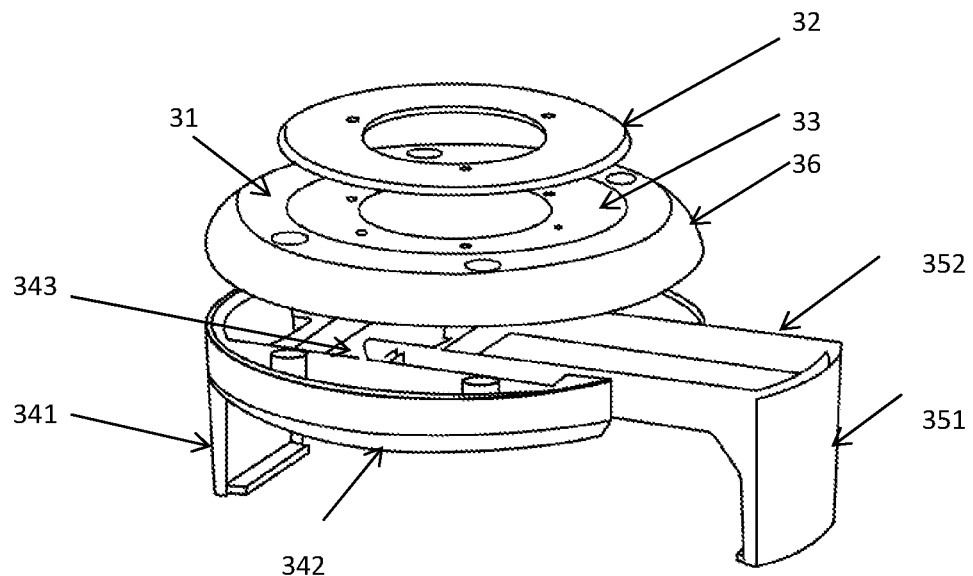
Figure 3D:
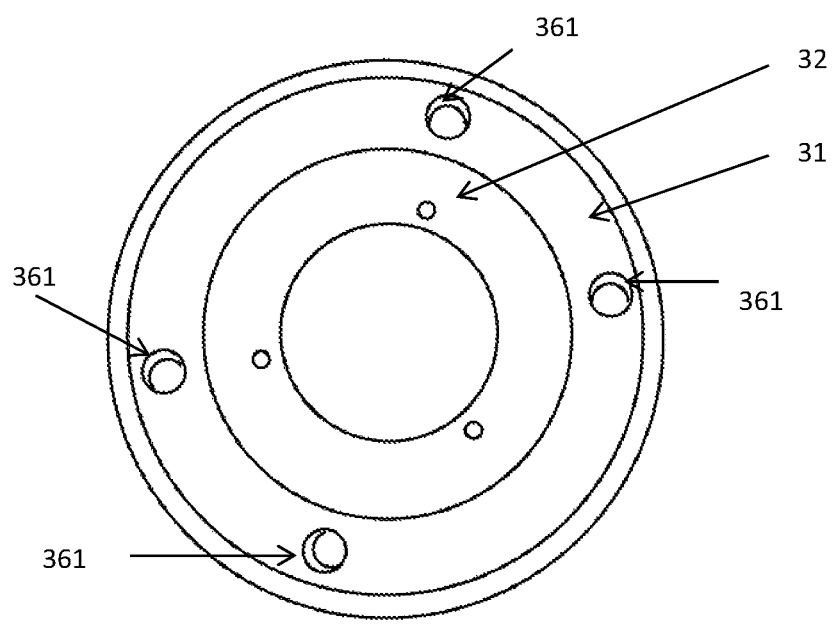

In one embodiment, for example, the one or more pieces 32 may be an annular plate housed in a receiving space 33 in a back piece 36 as shown in FIG. 3C-3D. The back piece 36 may be provided to complete the assembly of the receiving component. Fasteners may be provided to fasten connection between the back piece 36 and the first arm 34 and the second arm 35.

The one or more pieces 32 may be also of various sizes and shapes that include, but are not limited to, such as plate, block, column, prism, or any other regular or irregular shapes.

Figure 4:
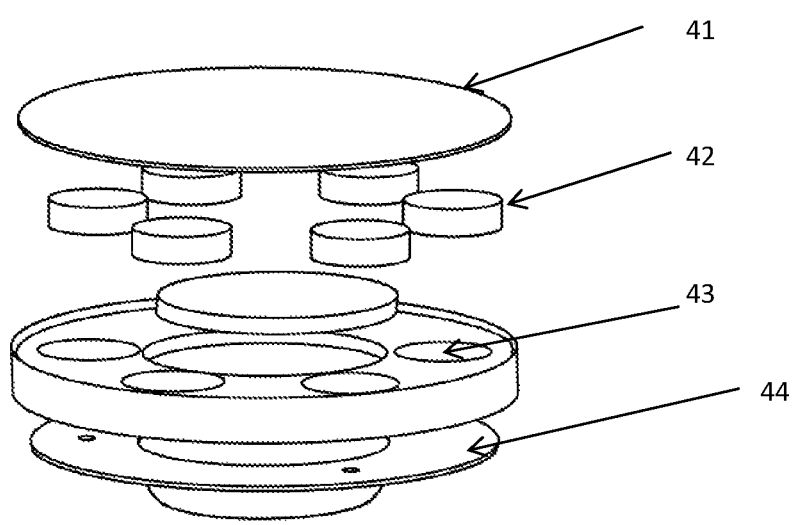
FIG. 4 is an illustration according to an embodiment of a mounting apparatus for a portable electronic device in FIG. 1, showing an explosion view of the second magnetic component.

The one or more permanent magnets 42 may be of various sizes, shapes or numbers. In one embodiment, as shown in FIG. 4, the one or more permanent magnets 42 may be six round permanent magnets, each embedded in a chamber 43 respectively. The one or more permanent magnets 42 may be also of various other sizes and shapes that include, but are not limited to, such as plate, block, column, prism, or any other regular or irregular shapes.

In one embodiment, the first magnetic component 32 or the second magnetic component 42 may be symmetrical in shape or in arrangement. In other embodiments, the first magnetic component 32 or the second magnetic component 42 may be asymmetrical in shape or in arrangement.

In addition, in an alternative embodiment, the first magnetic component 3 may comprise one or more permanent magnets, and the second magnetic component 4 may comprise one or more pieces that are ferromagnetic or ferrimagnetic. In another alternative example, the first magnetic component 3 may comprise one or more permanent magnets, and the second magnetic component 4 may also comprise one or more permanent magnets. In the latter example, the magnetic poles of one or more permanent magnets of the first magnetic component 3 and the magnetic poles of one or more permanent magnets of the second magnetic component 4 are arranged during manufacturing, to provide alternating magnetic poles facing each other when first magnetic component 3 and the second magnetic component 4 are stacked or attached, such as to produce proper magnetic interaction between the first magnetic component 3 and the second magnetic component 4.

The arrangement of permanent magnets 42 within the receiving component 4, as shown in FIG. 4, is preferable, because in this arrangement the permanent magnets 42 is at a further distance away from the portable electronic device to be mounted on the mounting apparatus. Thus in this arrangement the permanent magnets 42 exerts little to less interference to the use of portable electronic device, comparing to the alternative arrangement of having the permanent magnets in the receiving component 3.

As shown in FIG. 4, while the second magnetic component 4 comprises one or more permanent magnets 42, the second magnetic component 4 may further comprises a second piece 44 that is ferromagnetic or ferrimagnetic; and the one or more permanent magnets 42 is sandwiched between the second piece 44 and the second contact surface 41. The second piece 44 provides a magnetic attraction to the permanent magnets 42, to provide stabilizing forces to the permanent magnets 42 which ensures the stability of the structure assembly of the second magnetic component 4.

According to an embodiment, the first magnetic component 3 and the second magnetic component 4 are configured to connect while the first magnetic component 3 and the second magnetic component 4 are either partially or fully aligned. As described herein, the term "fully aligned" or "full alignment" is used to refer to a maximal overlap between the first magnetic component 3 and the second magnetic component 4. As described herein, the term "partially aligned" or "partial alignment" is used to refer to a less than maximal overlap between the first magnetic component 3 and the second magnetic component 4. A partial alignment between the first magnetic component 3 and the second magnetic component 4 is sufficient to provide the connection between the receiving component 1 and the attachment component 2, because magnetic interaction during partial alignment is sufficient to support a stable connection. Since a full alignment between the first magnetic component 3 and the second magnetic component 4 is not required, the mounting apparatus may be used with greater flexibility.

According to an embodiment, when the first magnetic component and the second magnetic component are connected, connection between the first magnetic component and the second magnetic component is greater than a predetermined threshold value. This ensures that the first magnetic component is configured to stay connected to the second magnetic component when the receiving component holds the portable electronic device. It is conceivable that more weight of a portable electronic device requires more magnetic interaction force to stabilize a magnetic connection. It is conceivable that testing of different portable electronic devices having different sizes and weight configurations may help to choose a predetermined threshold value. A predetermined threshold value may be determined when consideration of various factors are combined, such as the general type of portable electronic devices to be used on the mounting apparatus, needs of the users in the market, and variables or characteristics of conditions of use.

According to an embodiment, when the first magnetic component and the second magnetic component are connected, connection between the first magnetic component and the second magnetic component is detachable by a hand of a user.

According to an embodiment, the first arm 34 and the second arm 35 of the receiving component 1 are movable relative to each other. This allows a user to adjust the receiving component for holding different portable electronic devices. In one embodiment, only one of the two arms is configured to be moveable and the other one of the two arms is not. In another embodiment, both of the arms are configured to be moveable to allow adjustment of receiving component.

As shown in FIGS. 3A-3B and FIGS. 5A-D, the first arm 34 comprises a first arm piece 341, and a first member 342 with a sliding slot 343. The first arm piece 341 is provided at an end of the first member 342. The sliding slot 343 is provided between two protruding ribs 3421 on a side of the first member 342. The second arm 35 comprises a second arm piece 351 and a sliding member 352. The second arm piece 351 is provided at an end of the sliding member 352. The sliding member 352 is configured to slide in the sliding slot 343, to allow adjustment of relative distance between the first arm piece 341 and the second arm piece 351. Therefore, mounting apparatus is adaptable to different size configurations of different portable electronic devices. The sliding member 352 may be a rectangular shaped piece. The first member 342 further comprises a surface that may come in contact with and supports the portable electronic device mounted in the receiving component. Preferably, the surface may be substantially planar.

Figure 5A:
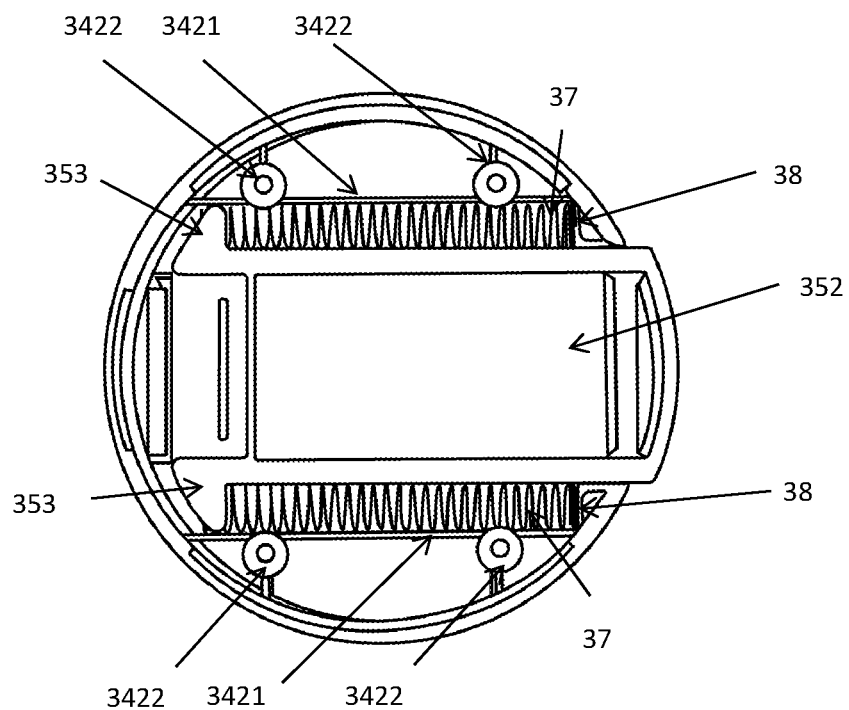
FIG. 5A-D is an illustration according to an embodiment of a mounting apparatus for a portable electronic device in FIG. 1, showing components or assembly of the first arm, and second arm.
Figure 5B:
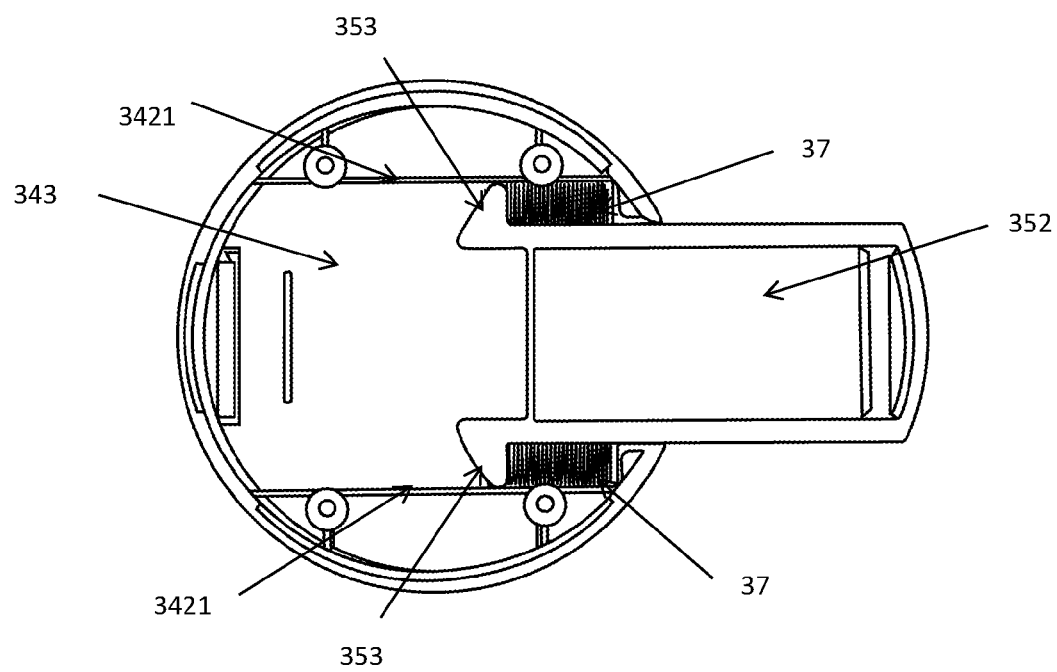
Figure 5C:
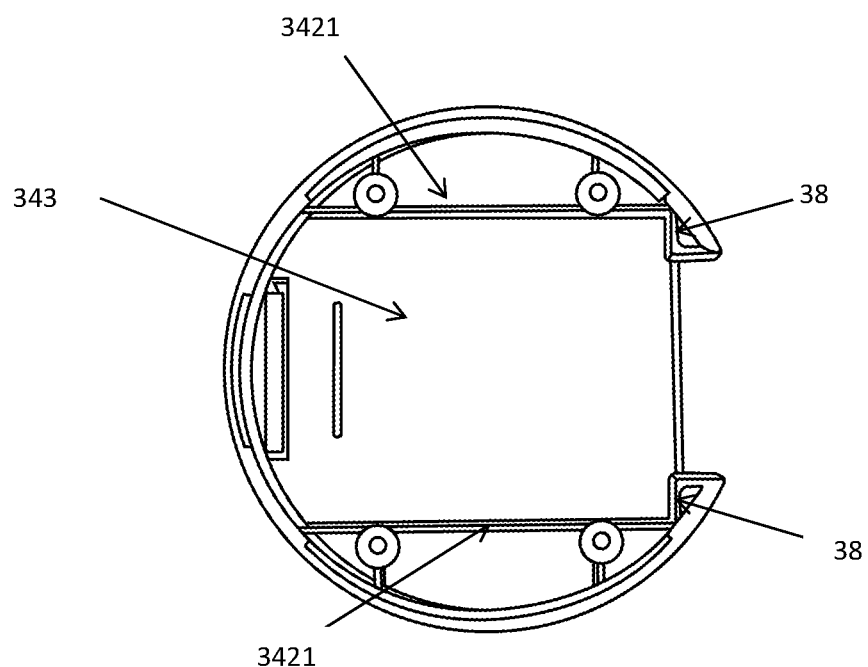
Figure 5D:
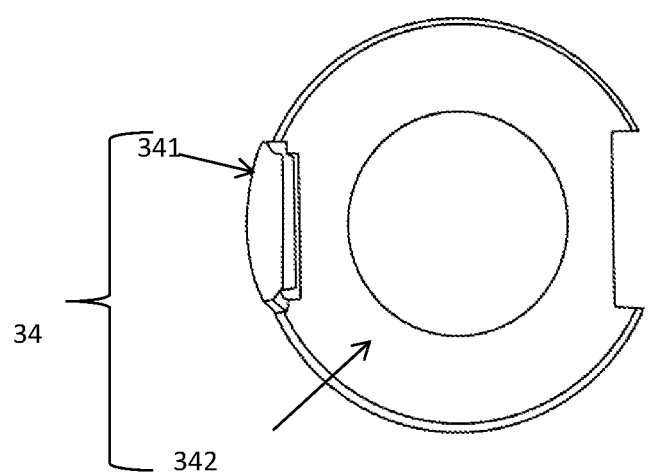

According to an embodiment of the mounting apparatus, the receiving component further comprises a spring 37 configured to urge the first arm piece and the second arm piece toward each other. During manufacturing assembly, the first arm 34 and the second arm 35 are assembled first, as shown in FIGS. 5A-5B, and springs 37 are provided respectively in two slots that are respectively formed by the sliding member 352 and two protruding ribs 3421 on the back of the first member 342. When the second arm piece 351 is pulled away from the first arm piece 341, springs 37 are compressed within the slots by end extension 353 of the sliding member 352 and end blocks 38 of the first member 342.

During use, a user may pull the second arm piece 351 away from the first arm piece 341, put a portable electronic device such as a cell phone in the opening between the first arm piece 341 and second arm piece 351, and then release the second arm piece 351. The second arm 35 swing back by the force of the springs 37, and the portable electronic device is held between the second arm piece 351 and the first arm piece 341. Preferably, the second arm piece 351 and the first arm piece 341 are arranged to be on different sides of the portable electronic device. The adjustment of relative distance between the first arm piece 341 and the second arm piece 351 is continuous. The second arm piece 351 or the first arm piece 341 may be of any size and shape that are sufficient to hold, secure, snap or grip the portable electronic device. The second arm piece 351 or the first arm piece 341 may be of a rectangular shaped piece, curved piece or claw shaped piece. The second arm piece 351 or the first arm piece 341 may have a surface contour that fits the overall contour of the receiving component.

As shown in FIG. 3, according to an embodiment, the first arm piece 341 comprises a cushion 3411 and the second arm piece 351 comprises a cushion 3511. The cushion 3411 and cushion 3511 may help to provide a protection of the exterior surface of the portable electronic device from being scratched or otherwise damaged when secured on the mounting apparatus. The cushion 3411 and cushion 3511 may also comprise elastic materials. This helps to provide enhanced fit or grip of the portable electronic during mounting.

According to an embodiment, as shown in FIG. 1-2, the attachment component 2 comprises a mounting member 5 and a base 6. The base 6 is configured to removably attach to a surface. The base 6 comprises a suction cup 61 and a lift for suction cup 62. The suction cup 61 may comprise elastic material. The suction cup 61 is configured to be engaged in airtight suction to the surface by forming substantial contact to the surface. This allows a stable attachment of the attachment component 2 to the surface. The suction cup 61 is substantially a planar. The suction cup 61 may be of any shape and size appropriate for use. The lift for suction cup 62 may be provided as an extension at an end of the suction cup 61, to allow a user to conveniently lift the suction cup 61.

According to an embodiment, as shown in FIG. 1-2, the mounting member 5 of the attachment component 2 further comprises a suction cup lever 53 configured to lock and unlock attachment of the suction cup 61 to a surface. When attaching the mounting apparatus to a surface, a user may activate the suction cup lever 53 by holding down the suction cup onto a surface and push the suction cup lever 61 to lock position; the suction cup 61 is lifted upward at a center of the suction cup away from the surface to be attached, creating a vacuum seal between the suction cup 61 and the surface. This ensures attachment of mounting device to the surface to be locked. When detaching the mounting apparatus from a surface, a user may push the suction cup lever 61 to unlock position, the center of the suction cup is released, and a user may further disassociate the suction cup 61 from the surface by pulling the lift for suction cup 62 away from the surface.

According to an embodiment, as shown in FIG. 1-2, the mounting member 5 is connected to the second magnetic component 4. The mounting member 5 further comprises an angle-adjusting knob 51, a first arm 54, a second arm 55 and a mount-adjusting knob 52. The angle-adjusting knob 51 allows changing the angle of the mounted portable electronic device. As shown in FIGS. 1G and 1H, the mount-adjusting knob 52 allows folding or unfolding of the first arm 54 relative to the second arm 55, and the angle-adjusting knob 51 allows rotation of the second magnetic component together with the attached receiving component relative to the attachment component, thereby changing the angle of the mounted portable electronic device. During use, viewing angle of the mounted portable electronic device may be adjusted by a user either through mount-adjusting knob 52, and/or through the angle-adjusting knob 51, therefore realizing the 360 degree rotation of the mounted portable electronic device.

Figure 6A:
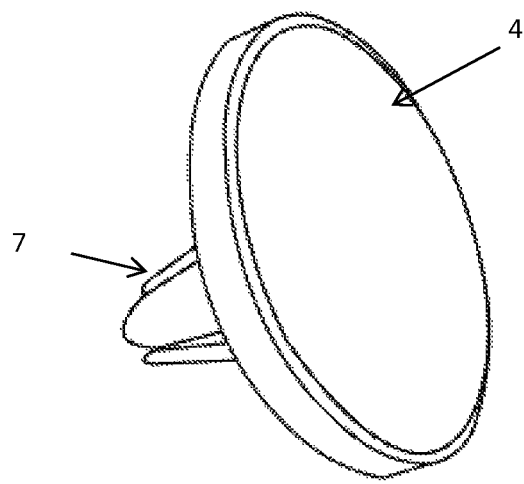
FIG. 6A-B is an illustration showing a second embodiment the attachment component of a mounting apparatus.
Figure 6B:
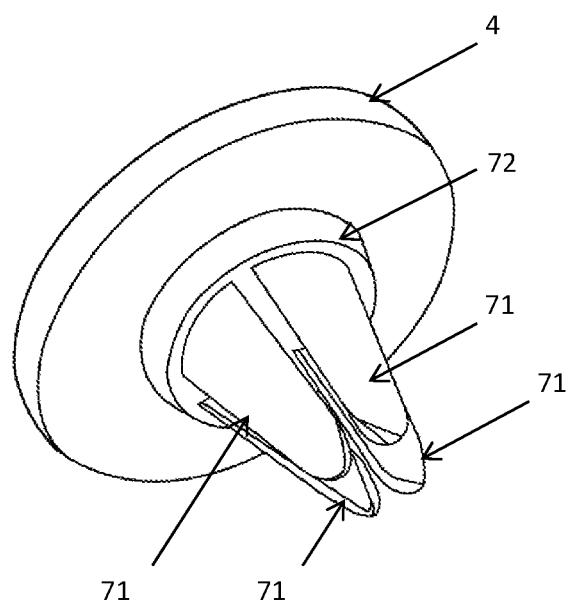

According to another embodiment, as shown in FIG. 6, the attachment component comprises the second magnetic component 4, and a mount 7 that is configured to be mounted on an air vent. In one example, the mount 7 comprises a plurality of clips 71 that may be inserted into the opening of an air vent of a vehicle. The clips 71 may be arranged to be perpendicular to the second magnetic component 4. The clips 71 may be equally spaced relative to each other. This ensures a sturdy and cradle-less attachment of the mounting apparatus. The portable electronic device is then mounted on the attachment component through magnetic interaction between the receiving component 1 and the attachment component 2. The strong-powered magnetic interaction ensures that the portable electronic device is securely held by the mounting apparatus, while the cradle-less feature enables a user to completely view his or her electronic device without any distracting views of arms and holders.

Figure 7A:
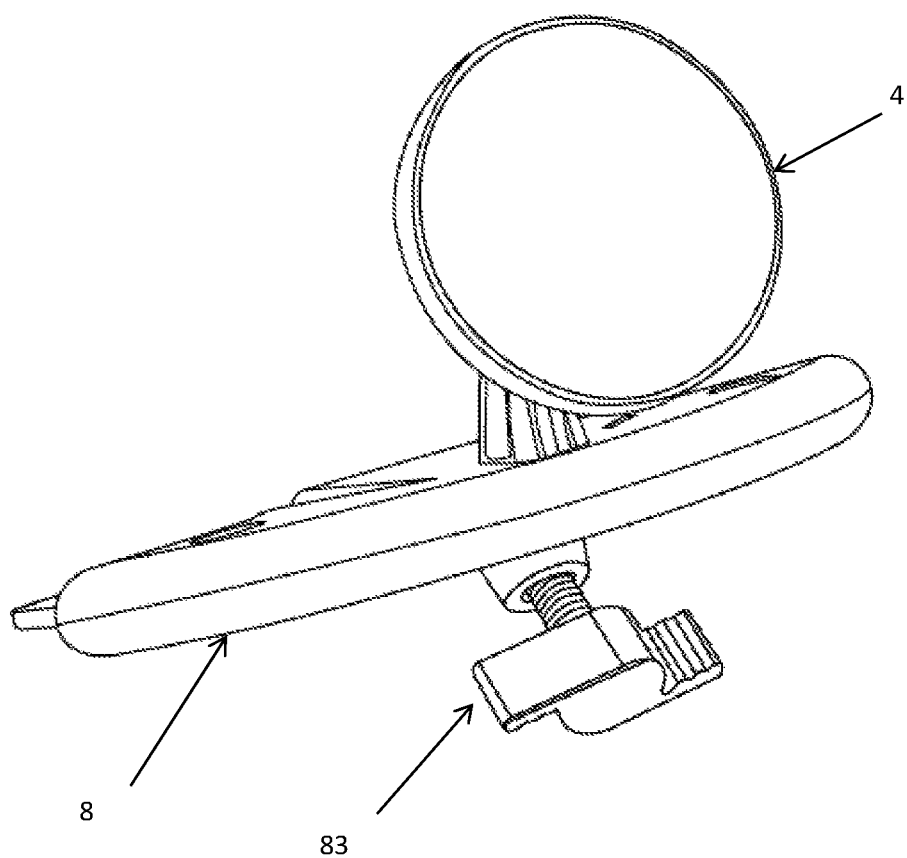
FIG. 7A-B is an illustration showing a third embodiment the attachment component of a mounting apparatus.
Figure 7B:
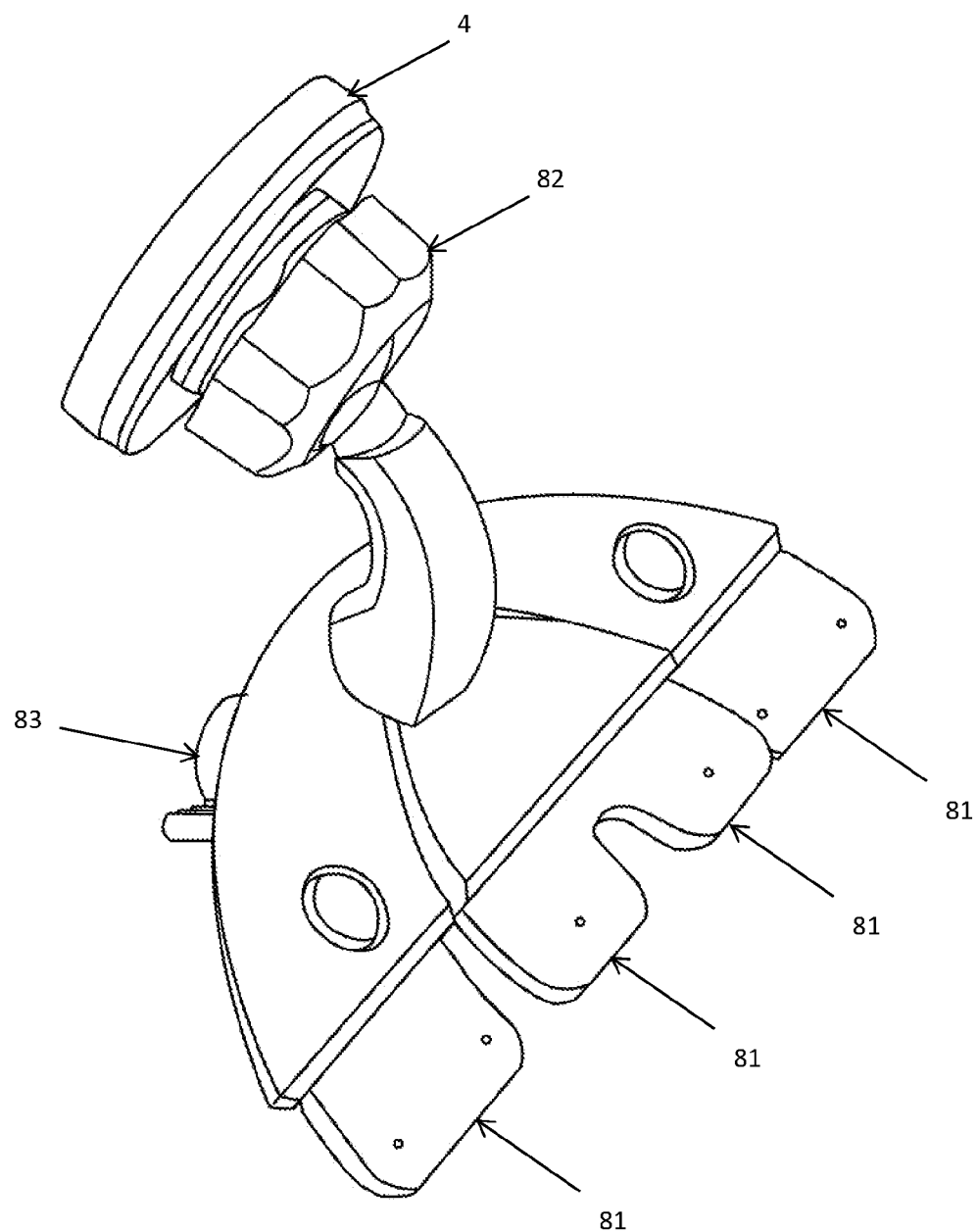

According to another embodiment, as shown in FIG. 7, the attachment component comprises the second magnetic component 4, and a mount 8 that is configured to mount on a CD slot in a vehicle. In one example, the mount 8 comprises a plurality of flattened extension 81 that may be inserted into the opening of a CD slot of a vehicle. The flattened extension 81 may be arranged at a suitable angle to the second magnetic component 4 by adjusting a knob 82 which is configured to allow 360 degree rotation of the second magnetic component 4, such that when the portable electronic device is then mounted on the mounting apparatus through magnetic interaction between the receiving component 1 and the attachment component 2, the portable electronic device is displayed at an easy viewing angle. The mount 8 does not block any other controls in the vehicle and does not interfere with the functioning of the CD player. A fastening means such as a mounting screw 83 is configured to fasten the contact between the mount 8 and the CD slot. The mount 8 is also configured to be easily rotated, tilted, or fixed to any angle that best assists the user.

Further described herein is a mounting apparatus, according to an embodiment, comprising a receiving component; the receiving component comprises a first magnetic component; the first magnetic component comprises one or more permanent magnet; the receiving component is configured to attach to a surface through a magnetic interaction between the first magnetic component and a material that is ferromagnetic or ferromagnetic in the surface; and the receiving component comprises a first arm, and a second arm; wherein the receiving component is configured to hold a portable electronic device by the first arm and the second arm. According to this embodiment, the mounting apparatus may attach directly to the surface; and the receiving component is continuously rotatable and continuously movable relative to the surface while it is attached.

According to an embodiment, the first magnetic component may be symmetrical in shape or arrangement. The first magnetic component may be an annular or circular plate.

According to an embodiment of the mounting apparatus, the magnetic connection is greater than a predetermined threshold value so that the first magnetic component is configured to stay connected to the contact surface while the receiving component holds the portable electronic device.

According to an embodiment of the mounting apparatus, the connection between the first magnetic component and surface is detachable by a hand of a user.

According to an embodiment of the mounting apparatus, the first arm and the second arm of the receiving component are movable relative to each other.

According to an embodiment of the mounting apparatus, the first arm comprises a first arm piece, and a first member with a sliding slot; the second arm comprises a second arm piece and a sliding member; and the sliding member of the second arm is configured to slide in the sliding slot of the first arm to allow adjustment of relative distance between the first arm piece and the second arm piece so that the mounting apparatus is adaptable to different size configurations of the portable electronic device.

According to an embodiment of the mounting apparatus, the adjustment of relative distance between the first arm piece and the second arm piece is continuous.

According to an embodiment of the mounting apparatus, further comprising a spring configured to urge the first arm piece and the second arm piece toward each other.

While the mounting apparatus has been described in detail with reference to specific embodiments thereof, it will be apparent to those skilled in the art that various changes and modifications can be made, and equivalents employed, without departing from the scope of the appended claims.

In another embodiment, as an alternative way of using the mounting device disclosed above, the mounting device as shown in FIG. 6, 8-10 is capable of operating without the use of a receiving component. A user may first place a magnet metal piece such as a thin magnet metal plate inside a case for a phone between the case and the back of the phone, or stick a metal piece on the back of a device such as a phone or a GPS. Next, the user may insert the mounting device on a vent for a car. Then the user may stick and secure the phone or GPS device to the mounting device because the magnetic component of the mounting device attracts the metal piece. The alternative way of using has advantages because a normal mount that is secured on a dashboard of a car may block a user's view. This magnetic car vent mount is easy to be put into a vent, does not block a user's view, secures a portable device firmly, and allows flexible adjustment such as tilting, rotating of the portable device to assist a user.

Figure 8:
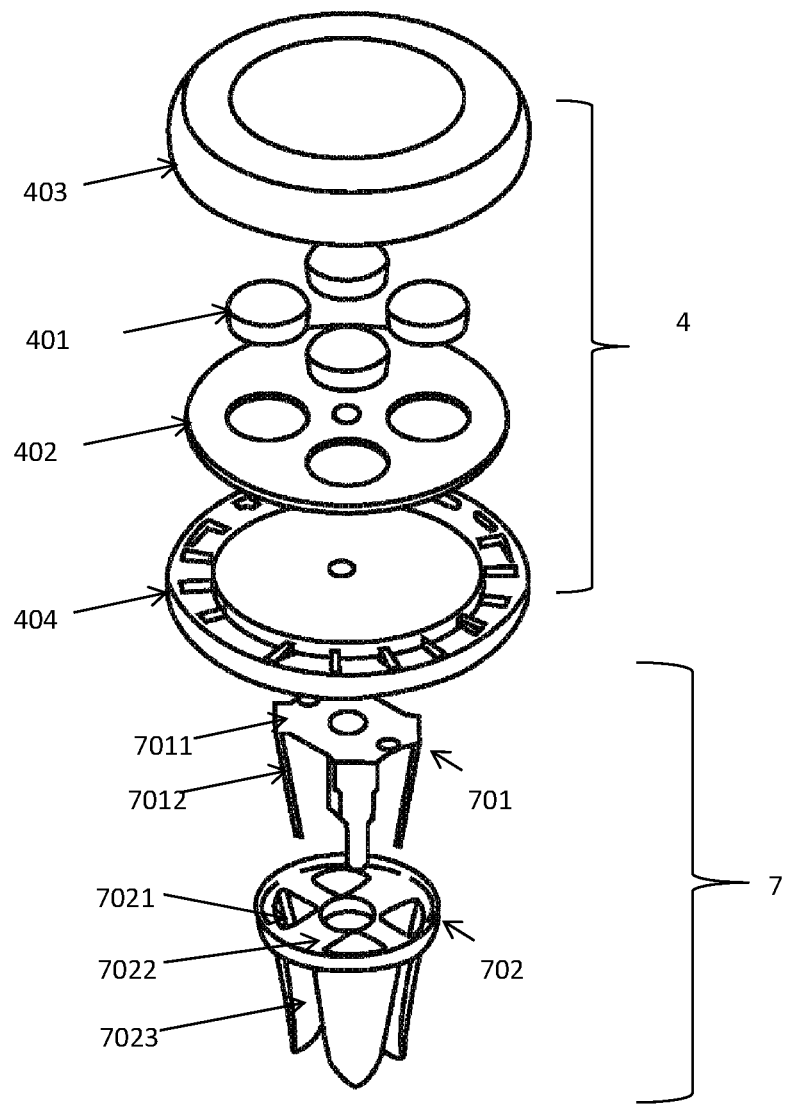
FIG. 8 is an explosion view of the mounting apparatus in FIG. 6A-B.

As shown in an explosion view in FIG. 8, the car mounting apparatus comprises a head 4 which comprises one or more permanent magnets 401. The one or more permanent magnets 401 may be of various sizes, shapes or numbers. In one embodiment, as shown in FIG. 8, there are four permanent magnets 401 embedded in a chamber and are arranged symmetrically, with each one shaped as a round plate.

The one or more permanent magnets 401 may be also of various other sizes and shapes that include, but are not limited to, such as block, column, prism, or any other regular or irregular shapes, and The one or more permanent magnets 401 may be arranged symmetrically relative to each other.

As shown in FIG. 8, the head 4 may further comprises a metal piece 402 that is ferromagnetic or ferrimagnetic; and the metal piece 402 is sandwiched between the one or more permanent magnets 401 and the lower case 404 of the head 4. The metal piece 402 provides a magnetic attraction to the permanent magnets 401, to provide stabilizing forces to hold the permanent magnets 401 within the space enclosed by the upper case 403 and the lower case 404 of the head 4, which ensures the stability of the structure.

As disclosed herein, the mounting apparatus as shown in FIGS. 6 and 8-10 is capable to attach to a surface of a portable device through a magnetic interaction between the magnetic component in the head direction of the mounting apparatus and a material that is ferromagnetic or ferrimagnetic on the surface of the portable device. The portable device may be a phone, a GPS, or the like.

Figure 9:
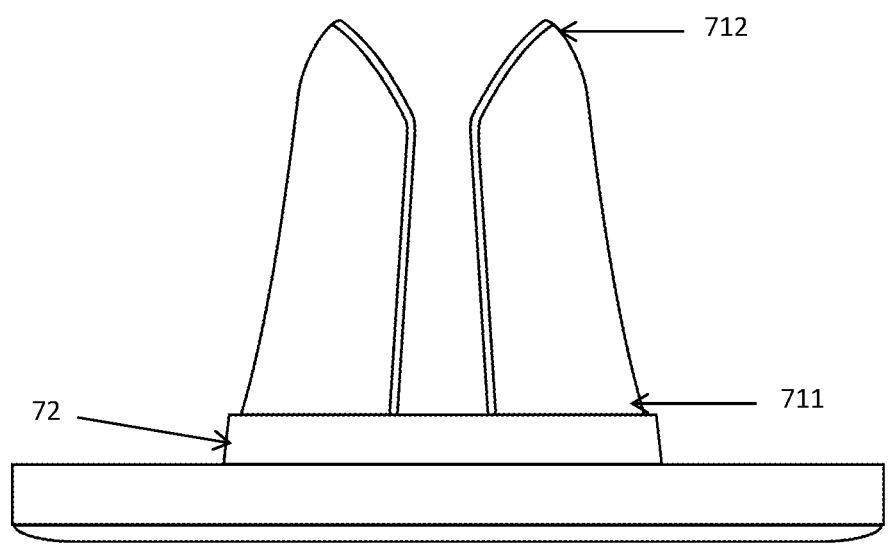
FIG. 9 is a front view of the mounting apparatus in FIG. 6A-B.

As shown in FIGS. 6 and 9, according to the embodiment, the mount 7 comprises a base 72 and a plurality of clips 71 which are configured to be mounted on an air vent in a vehicle. According to an embodiment of the mounting apparatus, the plurality of clips may be arranged at an angle such as close to perpendicular to the magnetic component and the head 4. More specifically, according to an embodiment as shown in FIG. 8, the plurality of clips 71 may comprise a first part 701 and a second part 702. The first part 701 comprises a top plate 7011 that joins four inner clips 7012 at four side of the top plate 7011. Each inner clip 7012 extends from the top plate 7011 at an angle close to perpendicular to the top plate. The angle may also be in a range from 45 degree to 90 degree depending on the design of the mount. The first part 701 can be made of a material that enables elasticity in the structure, such as a metal alloy. The first part 701 is configured to provide required elasticity of the clips 71 during use, so that each second end of the plurality of clips are bendable or may spring outward or inward relative to each other. The elasticity also provides flexibility in design and convenience in use. For example the clips may be forced to spring outward so that the clips are more apart from each other when the clips are mounted on a car vent, and the clips may spring inward back to its original form to more securely snap on the car mount.

As shown in FIG. 8, the second part 702 is configured to form a case for the first part 701. The second part 702 comprises pockets 7021, a recess 7022, and contacting surfaces 7023. Each pocket 7021 may enclose an inner clip 7012, and may provide a protective layer to inner clip 7012. The recess 7022 comprises a flat surface that forms a support to the top plate 7011 in the first part 701 and a vertical sidewall for enclosing the top plate 7012. The enclosed top plate 7011 and the recess 7022 form the base 72 as shown in FIG. 6. Contacting surfaces 7023 at each center-facing exterior side of the pockets 7021 may come into contact with a mounting surface on a car vent. Contacting surfaces 7023 can be made of a material including but not limited to plastic or rubber or other composite materials. Contacting surfaces 7023 may be textured and it is to provide better grip on the car vent or a subject onto which the mounting clips 71 are mounted.

There may be two modes of rotation of the clips. In a first embodiment of the rotation of the clips, the plurality of clips may be rotatable relative to the magnetic component while the plurality of clips remain perpendicular or close to perpendicular to the magnetic component by rotating the base 72 clockwise or counterclockwise relative to the head 4 while the plurality of clips maintain perpendicular or close to perpendicular to the magnetic component. The base 72 may be connected to the head 4 through a screwing mechanism or other similar mechanisms.

Figure 11A:
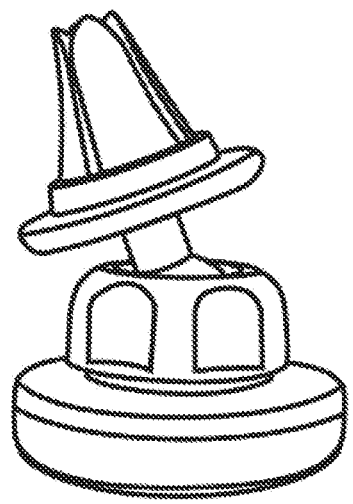
FIG. 11A-11C is illustrations according to an embodiment of a mounting apparatus.
Figure 11B:
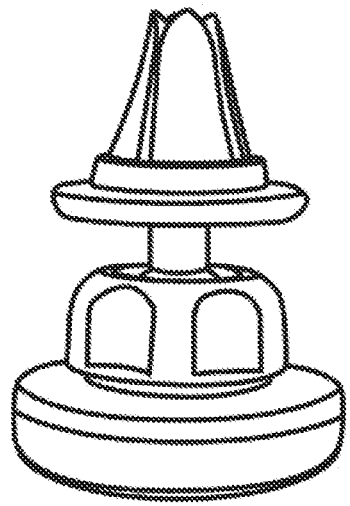
Figure 11C:
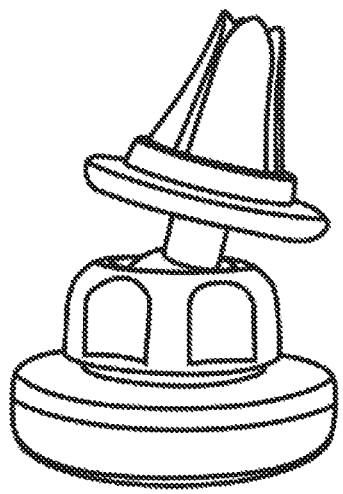
Figure 12:
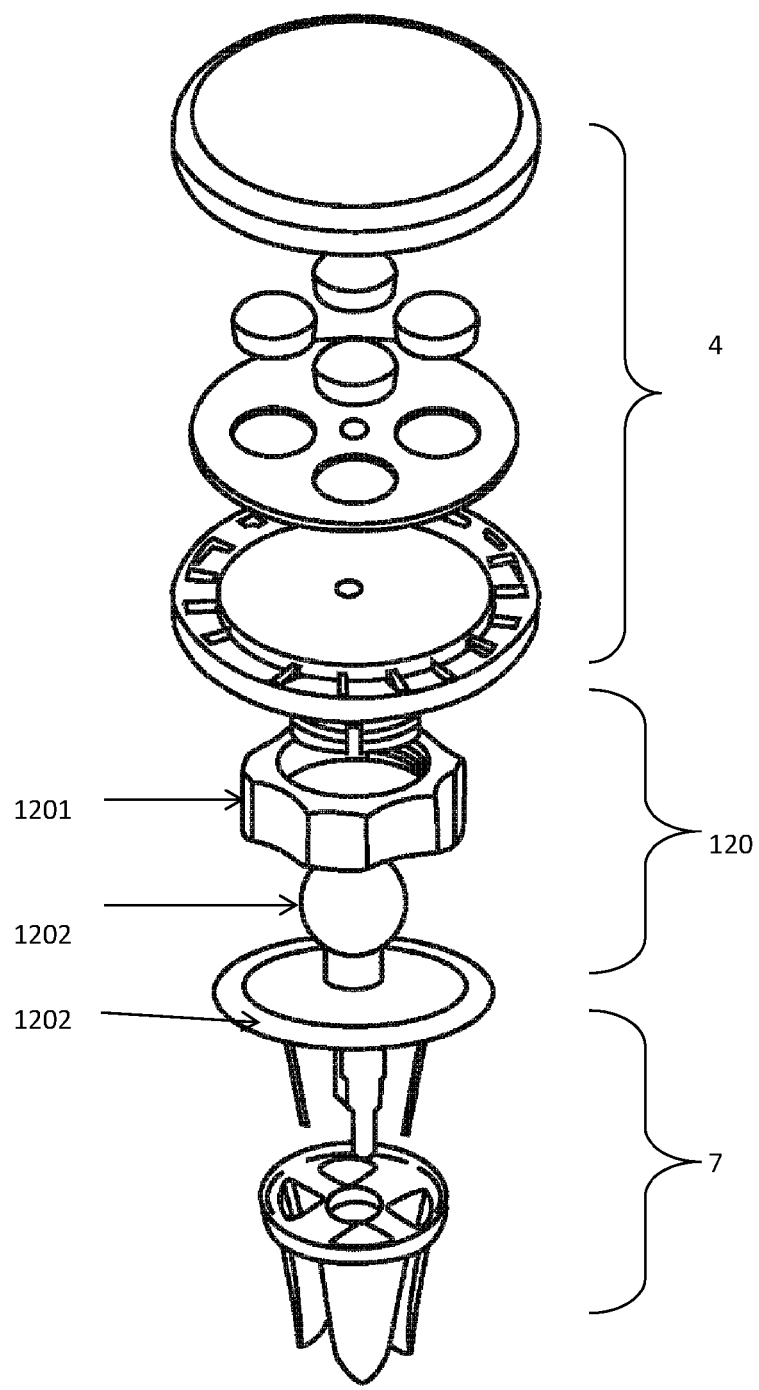
FIG. 12 is an explosion view of the mounting apparatus in FIG. 11A-C.

In a second embodiment of the rotation of the clips, as shown in FIG. 11A-11C, the plurality of clips are configured to be rotatable relative to the magnetic component so that an angle between the plurality of clips and the magnetic component is adjustable. The plurality of clips are allowed to move and maintain at an angle either of 90 degrees which is perpendicular to the magnetic component, or at another angle other than perpendicular to the magnetic component. As shown in FIG. 12, this second mode of rotation is achieved by having an additional knob 120 between the head 4 and the base 7. The knob 120 may utilize a ball joint that comprises a stud 1202 and a socket 1201. The ball part of stud 1202 fits into the socket 1201. The socket 1201 may be removably connected to the lower case 404 of the head 4 through a screwing thread. The extension on stud 1202 connects to the first part 701 of the clip 71. The knob 120 is used for allowing free movement of clips 71 in two planes at the same time. During use, by adjusting the knob 120, the base 7 and clips 71 are allowed to turn freely relative to the base.

As shown in FIG. 9, each of the plurality of clips 71 has a first end 711 close to the magnetic component and a second end 712 further away from the magnetic component, and a cross sectional area of the second end is smaller than a cross sectional area of the first end.

Figure 10:
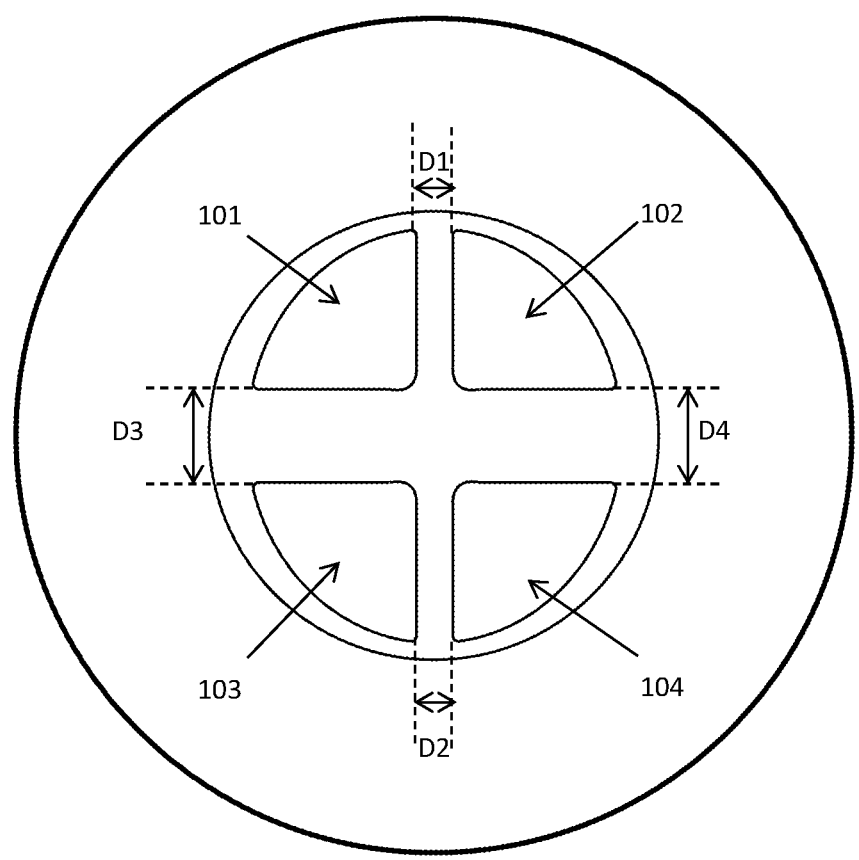
FIG. 10 is a cross sectional view showing the first ends of the clips in the mounting apparatus in FIG. 6A-B.

In general the spacing of clips is designed to take into consideration that clips may be inserted into the openings between the bars inside a car vent or a damper in the vent opening. Preferably, a mount is more secured if two pairs of four clips are used. FIG. 10 is a cross sectional view showing the first ends of the clips in the mounting device as shown in FIG. 6. As shown in FIG. 10, there are 4 gap distances with respect to the arrangement of a first pair of two clips 101, 102 and a second pair of two clips 103, 104; a first inner distance D1 between the two clips 101 and 102 in the first pair and a second inner distance D2 between the two clips 103 and 104 in the second pair may be the same. Furthermore, an inter distance D3 between the clips 101 and 103 and an inter distance D4 between the clips 102 and 104 may be the same. D3 or D4 are greater than the first inner distance D1 or the second inner distance D2. The above scheme provides that there may be two ways of using the clips based on the size of a bar of a car vent. When the size of the horizontal bar is relatively close to the gap distance D3 or D4, the first pair of clips 101 and 102 may be inserted in one side of a bar inside a car vent and the second pair of clips 103 and 104 may be inserted in the other side of a bar inside a car vent, so that the four clips together form a clamp on the bar of the car vent. Alternatively, when the size of the bar is relatively close to the gap distance D1 or D2, the pair of clips 101 and 103 may be inserted into one side of a bar and the pair of clips 102 and 104 may be inserted into the other size of the bar, so that the four clips together form a clamp on the bar of the car vent.

As also shown in FIG. 10, the four clips are arranged to be spaced apart along a circle. The cross section of each of the first end has a quadrant shape. Each of the four clips is identical to each other. This design of the four clips is efficient as they may provide strong hold on a car vent after mounting, and is convenient to manufacture and may reduce manufacturing cost. Other designs may be available as well. For example, there may be clips not arranged along a circle. For example, the cross section of a first end is a shape other than a quadrant shape. For example, each of the clips is not identical to each other.

While the mounting apparatus has been described in detail with reference to specific embodiments thereof, it will be apparent to those skilled in the art that various changes and modifications can be made, and equivalents employed, without departing from the scope of the appended claims.

What is claimed is:

1. A mounting apparatus, comprising
a magnetic component, and a mount;
wherein the magnetic component comprises one or more permanent magnet;
wherein the mounting apparatus is configured to attach to a surface of an electronic device through a magnetic interaction between the magnetic component and a material that is ferromagnetic or ferrimagnetic in the surface;
wherein the mount comprises a plurality of clips which are configured to be mounted on an air vent in a vehicle;
wherein the magnetic component is continuously adjustable in translation relative to the surface while the magnetic component and the surface are connected through magnetic interaction between the magnetic component and the material that is ferromagnetic or ferrimagnetic in the surface; and
wherein the magnetic component is continuously adjustable in rotation relative to the surface while the magnetic component and the surface are connected through magnetic interaction between the magnetic component and the material that is ferromagnetic or ferrimagnetic in the surface.

2. The mounting apparatus of claim 1, wherein the plurality of clips are arranged to be perpendicular to the magnetic component.

3. The mounting apparatus of claim 1, wherein the plurality of clips are configured to be rotatable relative to the magnetic component while the plurality of clips maintain perpendicular to the magnetic component.

4. The mounting apparatus of claim 1, wherein the plurality of clips are configured to be rotatable relative to the magnetic component so that an angle between the plurality of clips and the magnetic component is adjustable.

5. The mounting apparatus of claim 1, wherein each of the plurality of clips has a first end close to the magnetic component and a second end further away from the magnetic component, and a cross sectional area of the second end is smaller than a cross sectional area of the first end.

6. The mounting apparatus of claim 1, wherein the plurality of clips are made of elastic material such that each second end of the plurality of clips are bendable relative to each other.

7. The mounting apparatus of claim 1, wherein the plurality of clips are four clips comprising a first pair of two clips and a second pair of two clips; wherein a first inner distance between the two clips in the first pair and a second inner distance between the two clips in the second pair are the same.

8. The mounting apparatus of claim 7, wherein a inter distance between the first pair and the second pair is greater than the first inner distance.

9. The mounting apparatus of claim 7, wherein the four clips are arranged to be spaced apart along a circle.

10. The mounting apparatus of claim 7, wherein each of the four clips has a first end close to the magnetic component and a second end further away from the magnetic component, and a cross sectional area of the second end is smaller than a cross sectional area of the first end.

11. The mounting apparatus of claim 10, wherein the cross section of each of the first end has a quadrant shape.

12. The mounting apparatus of claim 10, wherein each second end of the four clips are bendable relative to each other.

13. The mounting apparatus of claim 7, wherein each of the four clips is identical to each other.

14. The mounting apparatus of claim 1, wherein the plurality of clips comprises a first part and a second part; wherein the first part comprises a top plate that joins four inner clips at four side of the top plate; wherein each inner clip extends from the top plate at an angle close to the top plate.

15. The mounting apparatus of claim 14, wherein the angle is in a range from 45 degree to 90 degree.

16. The mounting apparatus of claim 14, wherein the second part is configured to form a case for the first part and the second part comprises pockets, a recess, and contacting surfaces; wherein each pocket is configured to enclose an inner clip of the four inner clips, and the recess comprises a flat surface that is configured to form a support to the top plate in the first part and a vertical sidewall for enclosing the top plate; wherein the contacting surfaces at each center-facing exterior side of the pockets is configured to form contact with a mounting surface on a car vent.

17. The mounting apparatus of claim 1, comprising a ball joint knob that comprises a stud and a socket; wherein the ball joint knob is configured for allowing free movement of the plurality of clips in two planes at the same time.

18. The mounting apparatus of claim 17, wherein the stud comprise a the ball part of stud that fits into the socket; wherein the socket is removably connected to a head of the mounting apparatus through a screwing thread; wherein an extension on the stud connects to the plurality of clips.

* * * * *